United States Patent
Khoshnevisan et al.

(10) Patent No.: US 12,363,646 B2
(45) Date of Patent: Jul. 15, 2025

(54) TRANSMITTING UPLINK CONTROL INFORMATION ON PHYSICAL UPLINK CONTROL CHANNELS USING DIFFERENT TRANSMIT POWERS

(71) Applicant: QUALCOMM Incorporated, San Diego, CA (US)

(72) Inventors: Mostafa Khoshnevisan, San Diego, CA (US); Yitao Chen, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 17/574,376

(22) Filed: Jan. 12, 2022

(65) Prior Publication Data

US 2022/0225245 A1    Jul. 14, 2022

Related U.S. Application Data

(60) Provisional application No. 63/136,730, filed on Jan. 13, 2021.

(51) Int. Cl.
*H04W 52/32*    (2009.01)
*H04W 52/08*    (2009.01)
(Continued)

(52) U.S. Cl.
CPC ......... *H04W 52/325* (2013.01); *H04W 52/08* (2013.01); *H04W 52/146* (2013.01); *H04W 52/242* (2013.01)

(58) Field of Classification Search
None
See application file for complete search history.

(56) References Cited

U.S. PATENT DOCUMENTS 9,930,596 B2 *  3/2018  Choi ............... H04B 7/0417
11,723,041 B2 *  8/2023  Jung .............. H04W 72/23
                                                370/329
(Continued)

FOREIGN PATENT DOCUMENTS

EP        2988557 A1      2/2016
WO   WO-2019157851 A1 *  8/2019  .......... H04W 52/146
WO   WO-2023043912 A1 *  3/2023  .......... H04L 1/0001

OTHER PUBLICATIONS

International Search Report and Written Opinion—PCT/US2022/012268—ISA/EPO—Apr. 4, 2022.
Taiwan Search Report—TW111101463—TIPO—Apr. 16, 2025 (2101756TW).

*Primary Examiner* — Pablo N Tran
(74) *Attorney, Agent, or Firm* — Holland & Hart LLP

(57) ABSTRACT

Methods, systems, and devices for wireless communication are described. A user equipment (UE) may receive a message scheduling transmission, by the UE, of uplink control information (UCI) in a physical uplink control channel (PUCCH) resource. The UE may receive an indication that the UE is scheduled to transmit the UCI in the PUCCH resource to both a first transmission-reception point (TRP) and a second TRP. The UE may also receive a first set of uplink power control parameters for transmitting the UCI to the first TRP and a second set of uplink power control parameters for transmitting the UCI to the second TRP. The UE may transmit the UCI to the first TRP and to the second TRP in the PUCCH resource, based on the first set and the second set of uplink power control parameters, and without an uplink control channel beam indication.

30 Claims, 18 Drawing Sheets

(51) Int. Cl.
*H04W 52/14* (2009.01)
*H04W 52/24* (2009.01)
*H04W 72/12* (2023.01)

(56) References Cited

U.S. PATENT DOCUMENTS

| | | |
|---|---|---|
| 11,889,578 B2* | 1/2024 | Venkatram ............ H04W 76/28 |
| 11,910,434 B2* | 2/2024 | Abotabl ................ H04W 80/02 |
| 2020/0205149 A1 | 6/2020 | Khoshnevisan et al. |
| 2020/0228183 A1* | 7/2020 | Venugopal .......... H04W 72/046 |
| 2020/0229104 A1 | 7/2020 | Molavianjazi et al. |
| 2020/0245371 A1* | 7/2020 | Chande ................ H04W 72/23 |
| 2022/0046612 A1* | 2/2022 | Ma ...................... H04W 72/046 |
| 2022/0239411 A1* | 7/2022 | Taherzadeh Boroujeni ................ H04W 72/20 |
| 2022/0330156 A1* | 10/2022 | Zhou ................ H04W 52/0206 |
| 2023/0239854 A1* | 7/2023 | Newman ............ H04W 72/542 |
| 2023/0309021 A1* | 9/2023 | Bai ..................... H04W 52/325 |
| 2023/0396301 A1* | 12/2023 | Yuan ................... H04B 7/0417 |

* cited by examiner

TRANSMITTING UPLINK CONTROL INFORMATION ON PHYSICAL UPLINK CONTROL CHANNELS USING DIFFERENT TRANSMIT POWERS

CROSS REFERENCE

The present application for patent claims the benefit of U.S. Provisional Patent Application No. 63/136,730 by KHOSHNEVISAN et al., entitled "TRANSMITTING UPLINK CONTROL INFORMATION ON PHYSICAL UPLINK CONTROL CHANNELS USING DIFFERENT TRANSMIT POWERS," filed Jan. 13, 2021, assigned to the assignee hereof, and expressly incorporated by reference herein.

TECHNICAL FIELD

The following relates generally to wireless communications, and more specifically to transmitting uplink control information (UCI) on physical uplink control channels (PUCCHs) using different uplink transmit powers.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). A UE may transmit an uplink message carrying uplink control information (UCI) on a physical uplink control channel (PUCCH) using beamformed communications via directional beams. For example, a UE may be configured with multiple antenna panels to support the beamformed communications of the UCI on the PUCCH. In some examples, the UE may support beamformed communications with multiple transmission-reception points (TRPs) (e.g., access points, base stations, or other UEs). The UE may be configured to support the beamformed communications of the UCI on the PUCCH across different frequency ranges, such as a frequency range one (FR1) (also referred to as Sub-6 GHz frequency range) including frequencies between 410 MHz and 7.125 GHz, or a frequency range two (FR2) (also referred to as millimeter wave (mmW) frequency range) including frequencies between 24.25 GHz and 52.6 GHz.

SUMMARY

Various aspects of the described techniques relate to configuring a communication device, which may be a user equipment (UE), to use one or more sets of uplink power control parameters associated with physical uplink control channel (PUCCH) spatial relation information for a given uplink transmission (e.g., an uplink control information (UCI) transmission) to multiple transmission-reception points (TRPs) without having to define or indicate beam information associated with PUCCH spatial relation information to the UE. In some examples, a UE may receive a list of information elements (IEs) describing PUCCH spatial relation information. The UE may select one or two sets of uplink power control parameters for an uplink transmission by activating two PUCCH spatial relation information from the list as described herein. The PUCCH spatial relation information IE may be in a default format, but the uplink beam information portion of the PUCCH spatial relation information IE may be either not configured for uplink transmissions in frequency range 1 (FR1), allowed to have a null value, or the UE may be allowed to ignore the uplink beam parameter for the uplink transmissions in FR1.

In some other examples, the UE may be configured with a list of uplink power control parameter sets that are separate from the PUCCH spatial relation information IE, and the UE may select one or more uplink power control parameter sets from the list as described herein. In other examples, each PUCCH resource in FR1 may be configured with one set or two sets of uplink power control parameters, and the UE may convey UCI using the one or two sets of uplink power control parameters. The UE may thus be configured to support improvements for transmitting, to multiple different TRPs, UCI on a PUCCH using different uplink power control parameters. The described techniques may also provide improvements to power consumption and, in some examples, may promote higher reliability and lower latency uplink operations, among other benefits.

A method for wireless communication at a UE is described. The method may include receiving a message scheduling transmission, by the UE, of UCI in a PUCCH resource, receiving an indication that the UE is scheduled to transmit the UCI in the PUCCH resource to both a first TRP and a second TRP, receiving a first set of uplink power control parameters for transmitting the UCI to the first TRP and a second set of uplink power control parameters for transmitting the UCI to the second TRP, and transmitting the UCI to the first TRP and to the second TRP in the PUCCH resource, based at least in part on the first set of uplink power control parameters, and the second set of uplink power control parameters, and without an uplink control channel beam indication.

An apparatus for wireless communication at a UE is described. The apparatus may include at least one processor, and memory coupled (e.g., operatively, communicatively, functionally, electronically, or electrically) to the at least one processor, the memory storing instructions. The instructions may be executable by the at least one processor to cause the apparatus to receive a message scheduling transmission, by the UE, of UCI in a PUCCH resource, receive an indication that the UE is scheduled to transmit the UCI in the PUCCH resource to both a first TRP and a second TRP, receive a first set of uplink power control parameters for transmitting the UCI to the first TRP and a second set of uplink power control parameters for transmitting the UCI to the second TRP, and transmit the UCI to the first TRP and to the second TRP in the PUCCH resource, based at least in part on the first set of uplink power control parameters, and the second set of uplink power control parameters, and without an uplink control channel beam indication.

Another apparatus for wireless communication at a UE is described. The apparatus may include means for receiving a message scheduling transmission, by the UE, of UCI in a PUCCH resource, means for receiving an indication that the UE is scheduled to transmit the UCI in the PUCCH resource to both a first TRP and a second TRP, means for receiving a first set of uplink power control parameters for transmitting the UCI to the first TRP and a second set of uplink power control parameters for transmitting the UCI to the second TRP, and means for transmitting the UCI to the first TRP and to the second TRP in the PUCCH resource, based at least in part on the first set of uplink power control parameters, and the second set of uplink power control parameters, and without an uplink control channel beam indication.

A non-transitory computer-readable medium storing code for wireless communication at a UE is described. The code may include instructions executable by at least one processor to receive a message scheduling transmission, by the UE, of UCI in a PUCCH resource, receive an indication that the UE is scheduled to transmit the UCI in the PUCCH resource to both a first TRP and a second TRP, receive a first set of uplink power control parameters for transmitting the UCI to the first TRP and a second set of uplink power control parameters for transmitting the UCI to the second TRP, and transmit the UCI to the first TRP and to the second TRP in the PUCCH resource, based at least in part on the first set of uplink power control parameters, and the second set of uplink power control parameters, and without an uplink control channel beam indication.

Some examples of the method, apparatuses, and non-transitory computer-readable medium described herein may further include operations, features, means, or instructions for receiving signaling including a set of PUCCH spatial relation information, selecting at least two PUCCH spatial relation information from the set of PUCCH spatial relation information based on a medium access control-control element (MAC-CE) message, the at least two PUCCH spatial relation information including first PUCCH spatial relation information and second PUCCH spatial relation information, and determining the first set of uplink power control parameters and the second set of uplink power control parameters for the PUCCH resource based on the at least two PUCCH spatial relation information.

In some examples of the method, apparatuses, and non-transitory computer-readable medium described herein, a set of uplink beam parameters may be not configured in the set of PUCCH spatial relation information.

Some examples of the method, apparatuses, and non-transitory computer-readable medium described herein may further include operations, features, means, or instructions for refraining from applying a set of uplink beam parameters associated with the set of PUCCH spatial relation information.

In some examples of the method, apparatuses, and non-transitory computer-readable medium described herein, a set of uplink beam parameters associated with the set of PUCCH spatial relation information may be nulled.

In some examples of the method, apparatuses, and non-transitory computer-readable medium described herein, a set of uplink beam parameters includes a synchronization signal block (SSB) parameter, a channel state information reference signal (CSI-RS) parameter, or a sounding reference signal (SRS) parameter, or a combination thereof.

Some examples of the method, apparatuses, and non-transitory computer-readable medium described herein may further include operations, features, means, or instructions for receiving an radio resource control (RRC) message including one or more set of uplink power control parameters for the PUCCH resource, where each set of the one or more set of uplink power control parameters includes an uplink power control parameter set identifier, a PUCCH power index value, a PLRS index value, or a closed loop index value, or a combination thereof.

Some examples of the method, apparatuses, and non-transitory computer-readable medium described herein may further include operations, features, means, or instructions for receiving a MAC-CE message including a PUCCH resource identifier and one or more uplink power control parameter set identifiers and activating the one or more set of uplink power control parameters for the PUCCH resource based on the PUCCH resource identifier and the one or more uplink power control parameter set identifiers.

Some examples of the method, apparatuses, and non-transitory computer-readable medium described herein may further include operations, features, means, or instructions for determining that each PUCCH resource associated with a PUCCH transmission may be configured with a single set of uplink power control parameters based on the RRC message and transmitting the UCI to the first TRP and to the second TRP based on the single set of uplink power control parameters.

Some examples of the method, apparatuses, and non-transitory computer-readable medium described herein may further include operations, features, means, or instructions for determining that each PUCCH resource associated with a PUCCH transmission may be configured with multiple set of uplink power control parameters based on the RRC message, where the multiple set of uplink power control parameters includes the first set of uplink power control parameters and the second set of uplink power control parameters.

Some examples of the method, apparatuses, and non-transitory computer-readable medium described herein may further include operations, features, means, or instructions for determining the first set of uplink power control parameters including a first PUCCH power index value, a first PLRS index value, or a first closed loop index value, or a combination thereof and determining the second set of uplink power control parameters based on the first set of uplink power control parameters, the second set of uplink power control parameters including a second PUCCH power index value, a second PLRS index value, or a second closed loop index value, or a combination thereof.

Some examples of the method, apparatuses, and non-transitory computer-readable medium described herein may further include operations, features, means, or instructions for determining the second set of uplink power control parameters may be based on a set of uplink beam parameters including a reference signal index value.

Some examples of the method, apparatuses, and non-transitory computer-readable medium described herein may further include operations, features, means, or instructions for determining the second set of uplink power control parameters may be based on an RRC configuration.

In some examples of the method, apparatuses, and non-transitory computer-readable medium described herein, the RRC configuration may be per serving cell and each PUCCH resource may be configured per the serving cell.

In some examples of the method, apparatuses, and non-transitory computer-readable medium described herein, the RRC configuration may be per BWP and each PUCCH resource may be configured per the BWP.

In some examples of the method, apparatuses, and non-transitory computer-readable medium described herein, the RRC configuration may be per PUCCH resource.

In some examples of the method, apparatuses, and non-transitory computer-readable medium described herein, transmitting the UCI may include operations, features, means, or instructions for transmitting the UCI to the first TRP and to the second TRP via one of intra-uplink control channel resource beam hopping, intra-slot repetition, or inter-slot repetition based on a number of repetitions associated with transmitting the UCI.

A method for wireless communication at a first TRP is described. The method may include transmitting a message scheduling transmission, by a UE, of UCI in a PUCCH resource, transmitting an indication that the UE is scheduled to transmit the UCI in the PUCCH resource to both the first TRP and a second TRP, transmitting a first set of uplink power control parameters for the UE to transmit the UCI to the first TRP and a second set of uplink power control parameters for the UE to transmit the UCI to the second TRP, and receiving the UCI in the PUCCH resource, based at least in part on the first set of uplink power control parameters, and without an uplink control channel beam indication.

An apparatus for wireless communication at a first TRP is described. The apparatus may include at least one processor and memory coupled (e.g., operatively, communicatively, functionally, electronically, or electrically) to the at least one processor, the memory storing instructions. The instructions may be executable by the at least one processor to cause the apparatus to transmit a message scheduling transmission, by a UE, of UCI in a PUCCH resource, transmit an indication that the UE is scheduled to transmit the UCI in the PUCCH resource to both the first TRP and a second TRP, transmit a first set of uplink power control parameters for the UE to transmit the UCI to the first TRP and a second set of uplink power control parameters for the UE to transmit the UCI to the second TRP, and receive the UCI in the PUCCH resource, based at least in part on the first set of uplink power control parameters, and without an uplink control channel beam indication.

Another apparatus for wireless communication at a first TRP is described. The apparatus may include means for transmitting a message scheduling transmission, by a UE, of UCI in a PUCCH resource, means for transmitting an indication that the UE is scheduled to transmit the UCI in the PUCCH resource to both the first TRP and a second TRP, means for transmitting a first set of uplink power control parameters for the UE to transmit the UCI to the first TRP and a second set of uplink power control parameters for the UE to transmit the UCI to the second TRP, and means for receiving the UCI in the PUCCH resource, based at least in part on the first set of uplink power control parameters, and without an uplink control channel beam indication.

A non-transitory computer-readable medium storing code for wireless communication at a first TRP is described. The code may include instructions executable by at least one processor to transmit a message scheduling transmission, by a UE, of UCI in a PUCCH resource, transmit an indication that the UE is scheduled to transmit the UCI in the PUCCH resource to both the first TRP and a second TRP, transmit a first set of uplink power control parameters for the UE to transmit the UCI to the first TRP and a second set of uplink power control parameters for the UE to transmit the UCI to the second TRP, and receive the UCI in the PUCCH resource, based at least in part on the first set of uplink power control parameters, and without an uplink control channel beam indication.

Some examples of the method, apparatuses, and non-transitory computer-readable medium described herein may further include operations, features, means, or instructions for transmitting a set of PUCCH spatial relation information, where a set of uplink beam parameters may be not configured in the set of PUCCH spatial relation information.

In some examples of the method, apparatuses, and non-transitory computer-readable medium described herein, the set of uplink beam parameters in the set of PUCCH spatial relation information may be nulled.

In some examples of the method, apparatuses, and non-transitory computer-readable medium described herein, the set of uplink beam parameters includes an SSB parameter, a CSI-RS parameter, or an SRS parameter, or a combination thereof.

Some examples of the method, apparatuses, and non-transitory computer-readable medium described herein may further include operations, features, means, or instructions for transmitting an RRC message including one or more set of uplink power control parameters for the PUCCH resource, where each set of the one or more set of uplink power control parameters includes an uplink power control parameter set identifier, a PUCCH power index value, a PLRS index value, or a closed loop index value, or a combination thereof.

Some examples of the method, apparatuses, and non-transitory computer-readable medium described herein may further include operations, features, means, or instructions for transmitting a MAC-CE message including a PUCCH resource identifier and one or more uplink power control parameter set identifiers, where the MAC-CE message activates the one or more set of uplink power control parameters for the PUCCH resource based on the PUCCH resource identifier and the one or more uplink power control parameter set identifiers.

In some examples of the method, apparatuses, and non-transitory computer-readable medium described herein, each PUCCH resource of a set of PUCCH resources may be configured with a single set of uplink power control parameters based on the RRC message.

In some examples of the method, apparatuses, and non-transitory computer-readable medium described herein, each PUCCH resource of a set of PUCCH resources may be configured with multiple set of uplink power control parameters based on the RRC message.

DETAILED DESCRIPTION

Figure 1:
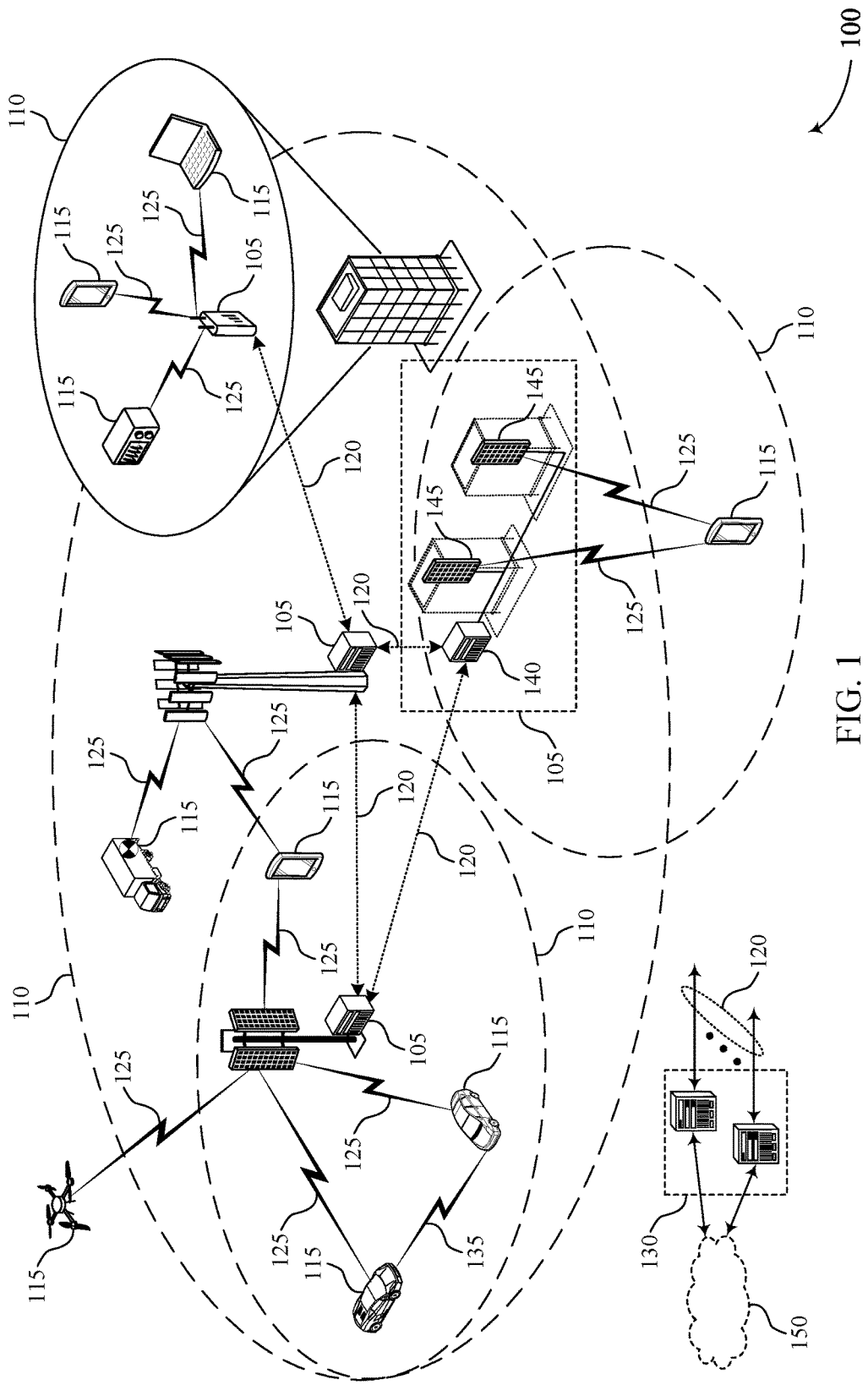
FIGS. 1 and 2 illustrate examples of wireless communications systems that support transmitting uplink control information (UCI) on physical uplink control channels (PUCCHs) using different transmit powers in accordance with aspects of the present disclosure.

A wireless communications system may include various communication devices such as a user equipment (UE) and a base station, which may provide wireless communication services to the UE. For example, such a base station may be a next-generation NodeB (referred to as a gNB) that may support multiple radio access technologies including fourth generation (4G) systems, such as 4G Long Term Evolution (LTE), as well as fifth generation (5G) systems, which may be referred to as 5G New Radio (NR). In the wireless communications system, the UE may transmit an uplink message carrying uplink control information (UCI) on a physical uplink control channel (PUCCH) to support various uplink operations using beamformed communications via directional beams. For example, a UE may be configured with multiple antenna panels to support the beamformed communications of the UCI on the PUCCH. The UCI may convey various information including feedback information (e.g., a hybrid automatic repeat request acknowledgment (HARQ-ACK), scheduling information (e.g., a scheduling request (SR)), or channel information (e.g., a channel state information (CSI) report), or any combination thereof, to uphold or improve the wireless communication services for the UE.

In the wireless communications system, the UE may support beamformed communications with multiple transmission-reception points (TRPs), for example, using multiple antenna panels. A TRP may be an access point, a base station, or another UE. A UE may be configured to support the beamformed communications of the UCI across different frequency ranges, such as a frequency range 1 (FR1) (e.g., 410 MHz-7.125 GHz) or a frequency range 2 (FR2) (e.g., 24.25 GHz-52.6 GHz). In some cases, the UE may experience interference in FR2. To mitigate the interference in FR2, the UE may support uplink transmissions over narrower directional beams. Thus, in FR2, the UE may transmit UCI on a PUCCH resource to two different TRPs, with each transmission within the PUCCH resource being on a different directional beams. However, in FR1, beam hopping for uplink transmissions to multiple TRP might not be needed.

A UE may be configured with PUCCH spatial relation information, which may be part of a radio resource control (RRC) configuration message, for example, in the format of an information element (IE) (e.g., a PUCCH spatial relation information IE). The PUCCH spatial relation information IE may include an indication of both beam information (e.g., a set of uplink beam parameters) and power information (e.g., a set of uplink power control parameters), which the UE may use for the uplink transmission of the UCI on the PUCCH to multiple TRPs. In FR2, both the beam information and the power information may be helpful for the transmission of the UCI on the PUCCH to the multiple TRPs. However, in FR1, the uplink transmit power information may be useful to the UE for transmission of the UCI on the PUCCH to multiple TRPs, while the beam information may be unnecessary for the UE to transmit the UCI on the PUCCH to multiple TRPs. Therefore it may be desirable to have one or more mechanisms in FR1 for signaling the power information separate from the beam information for uplink transmissions by the UE to multiple TRPs.

Various aspects of the present disclosure relate to signaling the power information separate from the beam information for uplink transmission in FR1, so that a UE may still be configured to use one or more sets of uplink power control parameters for a given uplink transmission (e.g., a UCI transmission) without having to define or indicate the beam information to the UE. In some examples, a UE may receive a list of PUCCH spatial relation information IEs. The UE may select one or two sets of uplink power control parameters for an uplink transmission by activating two PUCCH spatial relation information from the list based on receiving a control message (e.g., a medium access control (MAC) control element (CE) message, a downlink control information (DCI) message, or an RRC message), for example, from a TRP in the wireless communications system.

The PUCCH spatial relation information IE may be in a default format, but the uplink beam information portion of the PUCCH spatial relation information IE may be either not configured for uplink transmissions in FR1, allowed to have a null value (e.g., the uplink beam information is not provided), or the UE may be allowed to ignore the uplink beam parameter for the uplink transmissions in FR1. In some other examples, the UE may be configured with a list of uplink power control parameter sets that are separate from the PUCCH spatial relation information IE, and the UE may select one or more uplink power control parameter sets from the list based on a MAC-CE carrying an indication to activate respective uplink power control parameter sets from the list. In other examples, each PUCCH resource in FR1 may be configured with one set or two sets of uplink power control parameters, and the UE may convey UCI using the one or two sets of uplink power control parameters. The UE may also determine the second set of uplink power control parameters based on the first set of uplink power control parameters.

Aspects of the present disclosure may be implemented to realize one or more of the following potential advantages or improvements, among others. The present disclosure may provide benefits and enhancements to the operation of the UE. For example, operations performed by the UE may provide improvements to UCI transmissions to multiple TRPs in FR1. Additionally, the present disclosure may provide improvements in power savings for the UE. For example, the UE may increase its battery life by providing efficient uplink transmissions of UCI in the wireless communications system.

Aspects of the disclosure are initially described in the context of wireless communications systems. Aspects of the disclosure are further illustrated by and described with reference to apparatus diagrams, system diagrams, and flowcharts that relate to transmitting UCI on PUCCHs using different transmit powers.

FIG. 1 illustrates an example of a wireless communications system 100 that supports transmitting UCI on PUCCHs using different transmit powers in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a TRP, a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a TRP, a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some examples, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A base station 105 may transmit, to a UE 115, an RRC configuration message including a PUCCH spatial relation information IE, which may configure one or more uplink beam parameters for uplink transmissions (e.g., PUCCH transmissions) and one or more uplink power control parameters for uplink power control of the uplink transmissions. In some cases, a UE 115 may be configured with up to 8 PUCCH spatial relation information identifiers. For example, a base station 105 may transmit, to a UE 115, an RRC configuration message including up to 8 PUCCH spatial relation information identifiers for all PUCCH resources (e.g., not per PUCCH resource) for uplink transmissions (e.g., UCI transmissions). In some other cases, a UE 115 may be configured with up to 64 PUCCH spatial relation information identifiers. For example, a base station 105 may transmit, to a UE 115, an RRC configuration message including up to 64 PUCCH spatial relation information identifiers for all PUCCH resources (e.g., not per PUCCH resource) for uplink transmissions.

The one or more uplink beam parameters may correspond to beam information. For example, the one or more uplink beam parameters may include a reference signal parameter, which a UE 115 may use to determine an uplink beam, for example, based at least in part on a synchronization signal block (SSB), a CSI reference signal (RS) (CSI-RS), or a sounding reference signal (SRS). In some examples, a UE 115 may transmit an uplink transmission (e.g., a UCI transmission) on a PUCCH using a same spatial domain filter as that for a reception of a synchronization signal physical broadcast channel (SS/PBCH) block having an index provided by an SSB index associated with the reference signal parameter or a CSI-RS provided by a CSI-RS index associated with the reference signal parameter. Alternatively, the UE 115 may transmit an uplink transmission on a PUCCH using the same spatial domain filter as that for a transmission of an SRS having a resource index provided by a resource parameter associated with the reference signal parameter. The one or more uplink power control parameters may correspond to power information (e.g., uplink transmit power). For example, the one or more uplink power control parameters may include an uplink power control parameter set identifier, a PUCCH index value, a pathloss reference signal (PLRS) index value, or a closed loop index value, or a combination thereof.

A base station 105 may activate a PUCCH spatial relation information identifier for a UE 115 based on MAC-CE signaling. In some examples, a MAC-CE message may activate one of the 8 PUCCH spatial relation information identifiers for a given PUCCH resource. In some other examples, a MAC-CE message may activate one of the 64 PUCCH spatial relation information identifiers for a given PUCCH resource. Each PUCCH resource may be associated with one set of uplink beam parameters and one set of uplink power control parameters. In some cases, a base station 105 may activate up to 2 PUCCH spatial relation information identifiers for a UE 115 using MAC-CE signaling. That is, up to 2 PUCCH spatial relation information identifiers can be activated per PUCCH resource via a MAC-CE message.

A UE 115 may support beamformed communications with multiple TRPs, for example, using multiple antenna panels. The UE 115 may be also configured to support the beamformed communications of the UCI on a PUCCH across different frequency ranges, such as a FR1 (e.g., 410 MHz-7.125 GHz) or an FR2 (e.g., 24.25 GHz-52.6 GHz). In some examples, for FR2 transmissions, PUCCH spatial relation information may include both the one or more uplink beam parameters for uplink transmissions (e.g., PUCCH transmissions) and one or more uplink power control parameters for uplink power control of the uplink transmissions. In some examples, for FR1 transmissions, the one or more uplink beam parameters may not be needed for the uplink transmissions (e.g., PUCCH transmissions). However, the one or more uplink power control parameters may still be useful for the UE 115 to support and target different transmissions toward different TRPs in the wireless communications system 100.

A base station 105, in some cases, might not configure PUCCH spatial relation information for FR1 transmissions, in which case a UE 115 may determine the one or more uplink power control parameters for a PUCCH resource based at least in part on a configuration. For example, if a UE 115 is not configured with PUCCH spatial relation information for FR1 transmissions, the UE 115 may obtain a PUCCH index value (e.g., p0-PUCCH-Value) from am uplink power control parameter set (e.g., P0-PUCCH) associated with an uplink power control parameter set identifier (e.g., p0-PUCCH-Id) value equal to the minimum uplink power control parameter set identifier (e.g., p0-PUCCH-Id) value in the uplink power control parameter set (e.g., P0-PUCCH). In some examples, if a UE 115 is provided with a PLRS RS information and is not provided with PUCCH spatial relation information for FR1 transmissions, the UE 115 may obtain the reference signal value for a PLRS reference signal parameter (e.g., PUCCH-PathlossReferenceRS) from the PLRS index value (e.g., pucch-PathlossReferenceRS-Id) with index zero in the PLRS reference signal parameter (e.g., PUCCH-PathlossReferenceRS). The RS resource may be either on a primary cell or, if provided, on a serving cell indicated by a value of a PLRS linking parameter (e.g., pathlossReferenceLinking).

The wireless communications system 100 may support signaling of power information separate from beam information for uplink transmission in FR1, so that a UE 115 may still be configured to use at least two sets of uplink power control parameters for a given uplink transmission (e.g., a UCI transmission) without having to define or indicate the beam information to the UE 115. A UE 115 may receive a list of PUCCH spatial relation information IEs. The UE 115 may select two sets of uplink power control parameters for an uplink transmission by activating two PUCCH spatial relation information from the list based on receiving a control message (e.g., a MAC-CE message, a DCI message, or an RRC message), for example, from a base station 105. The PUCCH spatial relation information IE may be in a default format, but the uplink beam information portion of the PUCCH spatial relation information IE may be either not configured for an FR1 transmission, allowed to have a null value, meaning that the uplink beam information is not provided, or the UE 115 may be allowed to ignore the uplink beam parameter for the FR1 transmissions.

The UE may be configured, in some other examples, with a list of uplink power control parameter sets that are separate from the PUCCH spatial relation information IE, and the UE 115 may select one or more uplink power control parameter sets from the list based on a MAC-CE carrying an indication to active respective uplink power control parameter sets from the list. In other examples, each PUCCH resource in FR1 may be configured with one set or two sets of uplink power control parameters, and the UE 115 may convey UCI using the one or two sets of uplink power control parameters. The UE 115 may also determine the second set of uplink power control parameters based on the first set of uplink power control parameters. The UE 115 may thus be configured to support improvements to transmission of UCI by improving signaling (e.g., reducing overhead signaling) or latency of power information for the UCI transmission in FR1. The UE 115 may also experience improved power savings and, in some examples, may promote enhanced efficiency for higher reliability and lower latency UCI transmissions, among other benefits.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
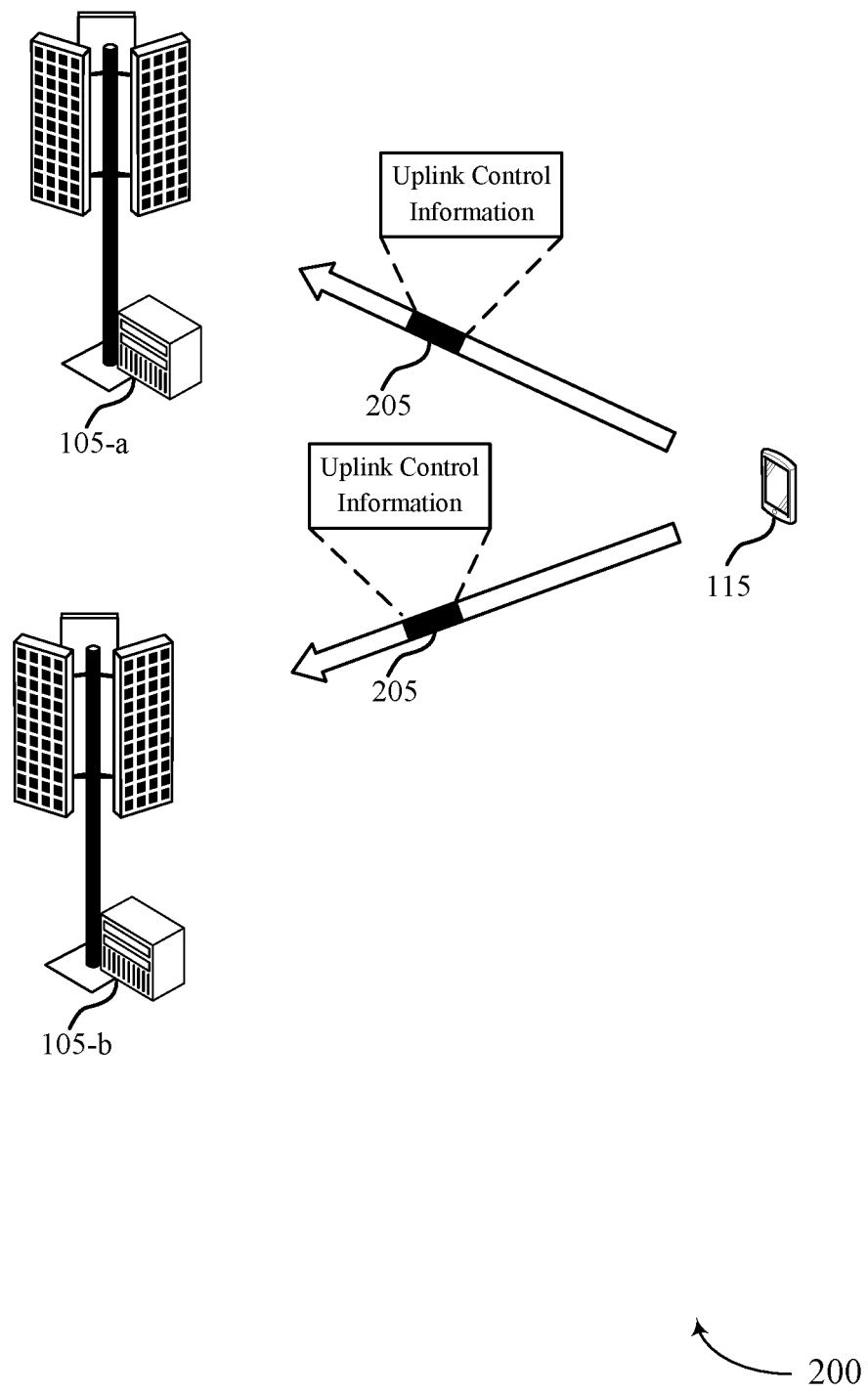

FIG. 2 illustrates an example of a wireless communications system 200 that supports transmitting UCI on PUCCHs using different transmit powers in accordance with aspects of the present disclosure. In some examples, the wireless communications system 200 may implement aspects of the wireless communications system 100 or may be implemented by aspects of the wireless communications system 100. For example, the wireless communications system 200 may include a TRP 105-a, a TRP 105-b, and a UE 115. The TRPs 105 and the UE 115 may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for higher reliability and lower latency UCI operations, among other benefits.

The TRPs 105 and the UE 115 may be configured with multiple antennas, which may be used to employ techniques such as transmit diversity, receive diversity, multiple-input multiple-output communications, or beamforming, or any combination thereof. The antennas of the TRPs 105 and the UE 115 may be located within one or more antenna arrays or antenna panels, which may support multiple-input multiple-output operations or transmit or receive beamforming. For example, the TRPs 105 antennas or antenna arrays may be co-located at an antenna assembly, such as an antenna tower. In some examples, antennas or antenna arrays associated with the TRPs 105 may be located in diverse geographic locations. The TRPs 105 may have an antenna array with a number of rows and columns of antenna ports that the TRPs 105 may use to support beamforming of communications with the UE 115. Likewise, the UE 115 may have one or more antenna arrays that may support various multiple-input multiple-output or beamforming operations. Additionally or alternatively, an antenna panel may support radio frequency beamforming for a signal transmitted via one or more antenna ports. The TRPs 105 and the UE 115 may thus be configured to support directional communications using the multiple antennas.

The UE 115, in the wireless communications system 200, may support operations to preserve resources (for example, time and frequency resources of the wireless communications system 200) or a battery life of the UE 115, among other examples. In some examples, the UE 115 may be configured to support UCI operations to manage or improve directional communications between the TRPs 105 and the UE 115. For example, the UE 115 may transmit an uplink message carrying a UCI 205 to manage or improve directional communications between the TRPs 105 and the UE 115, or any combination thereof. In the wireless communications system 200, one or more of the TRPs 105 and the UE 115 may support signaling of power information separate from beam information for uplink transmission of the UCI 205 in FR1, so that the UE 115 may still be configured to use at least two sets of uplink power control parameters for a given uplink transmission (e.g., a UCI transmission) without having to define or indicate the beam information to the UE 115.

In some examples, the UE 115 may receive, from one or more of the TRPs 105, a list of PUCCH spatial relation information IEs. The UE 115 may select two sets of uplink power control parameters for an uplink transmission of the UCI 205 by activating two PUCCH spatial relation information from the list based on receiving a control message (e.g., a MAC-CE message, a DCI message, or an RRC message), for example, from one or more of the TRPs 105. The PUCCH spatial relation information IE may be in a default format, but an uplink beam information portion of the PUCCH spatial relation information IE may not be configured for FR1. In some examples, an RRC parameter, such as a reference signal parameter used to determine an uplink beam for the uplink transmission of the UCI 205 might not be configured in the PUCCH spatial relation information IE for FR1. In some other examples, the uplink beam information portion of the PUCCH spatial relation information IE may be configured, but the UE 115 may be configured to ignore the uplink beam information for the uplink transmission of the UCI 205 for FR1. In other examples, the uplink beam information portion of the PUCCH spatial relation information IE may be nulled (e.g., have a null value).

Additionally or alternatively, to further reduce overhead signaling, one or more of the TRPs 105 may transmit, an RRC configuration message or a MAC-CE message, including power information (e.g., a list of uplink power control parameter sets in FR1) without the beam information. The list of uplink power control parameter sets may be configured for a PUCCH and not per PUCCH resource. Each uplink power control parameter set may be configured with an uplink power control parameter set identifier, a PUCCH power index value, a PLRS index value, or a closed loop index value, or a combination thereof. In some examples, one or more of the TRPs 105 may transmit, a MAC-CE message defined to activate one or two uplink power control parameter sets per PUCCH resource by indicating a PUCCH resource identifier and one or two identifiers corresponding to the one or two uplink power control parameter sets. For example, the UE 115 may select one or more uplink power control parameter sets from the list based on an RRC configuration message or a MAC-CE message carrying an indication to activate respective uplink power control parameter sets from the list. The configuration of the list and the MAC-CE message activating the respective uplink power control parameter sets from the list may be conditioned on PUCCH spatial relation information IE not being configured. In some examples, a size of the list and the size of the MAC-CE message may be smaller than the size of list of PUCCH spatial relation information identifiers.

In some other examples, each PUCCH resource in FR1 may be configured with one set or two sets of uplink power control parameters, and the UE 115 may convey the UCI 205 using the one or two sets of uplink power control parameters. For example, if the UE 115 transmits the UCI 205 in a PUCCH resource that is configured with two sets of uplink power control parameters, the UE 115 may transmit the UCI 205 using the two sets of uplink power control parameters according to a transmission scheme as described in FIGS. 3 through 5, respectively. For example, the UE 115 may transmit, to the TRP 105-a and the TRP 105-b, the UCI 205 via one of intra-uplink control channel resource beam hopping, intra-slot repetition, or inter-slot repetition based on a number of repetitions associated with transmitting the UCI 205.

In other examples, the UE 115 may determine a second set of uplink power control parameters based on a first set of uplink power control parameters of the at least two uplink power control parameter sets. For example, the UE 115 may determine the first set of uplink power control parameters including a first PUCCH power index value, a first PLRS index value, or a first closed loop index value, or a combination thereof, and determine the second set of uplink power control parameters based on the first set of uplink power control parameters, the second set of uplink power control parameters including a second PUCCH power index value, a second PLRS index value, or a second closed loop index value, or a combination thereof. In some examples, the UE 115 may determine the second set of uplink power control parameters based on a set of uplink beam parameters including a reference signal index value. In some other examples the UE 115 may determine the second set of uplink power control parameters based on an RRC configuration. The RRC configuration may be per serving cell and each PUCCH resource may be configured per the serving cell. Alternatively, the RRC configuration may be per BWP and each PUCCH resource may be configured per the BWP.

In the wireless communications system 200, the UE 115 may thus be configured to support improvements to transmission of UCI by improving signaling (e.g., reducing overhead signaling) or latency of power information for the UCI transmission in FR1. The UE 115 may also experience improved power savings and, in some examples, may promote enhanced efficiency for higher reliability and lower latency UCI transmissions in the wireless communications system 200.

Figure 3:
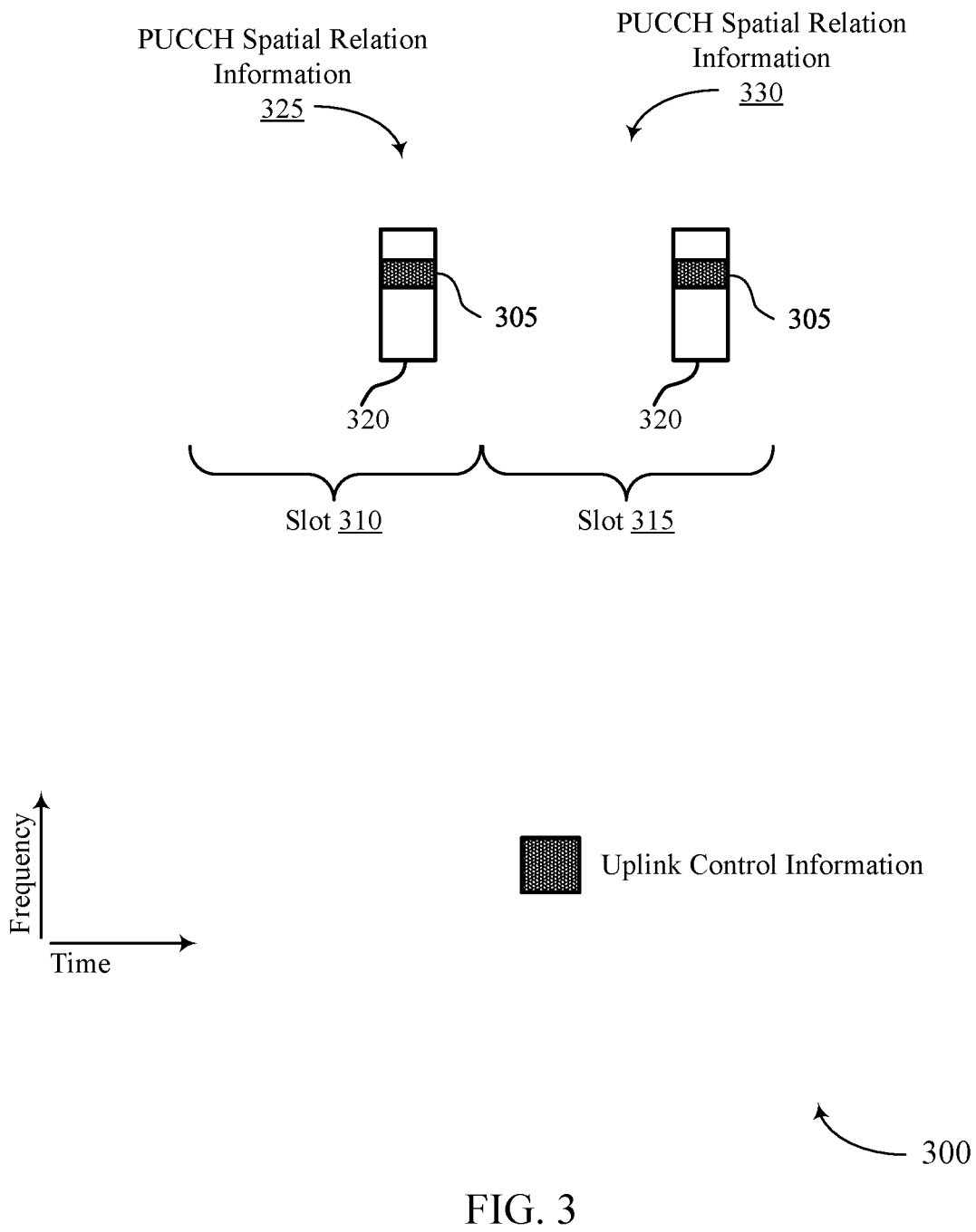
FIGS. 3 through 5 illustrate example of transmission schemes that support transmitting UCI on PUCCHs using different transmit powers in accordance with aspects of the present disclosure.

FIG. 3 illustrates an example of a transmission scheme 300 that supports transmitting UCI on PUCCHs using different transmit powers in accordance with aspects of the present disclosure. The transmission scheme 300 may be implemented by aspects of the wireless communications systems 100 and 200 or may implement aspects of the wireless communications systems 100 and 200 as described with reference to FIGS. 1 and 2, respectively. For example, the transmission scheme 300 may be implemented by a UE 115, as described with reference to FIGS. 1 and 2. The transmission scheme 300 may be implemented by the UE 115 to transmit UCI to multiple TRPs using at least two uplink power control parameter sets to improve efficiency and promote higher reliability for the uplink transmissions carrying the UCI, among other benefits.

The transmission scheme 300 may represent a multi-TRP inter-slot repetition transmission scheme. In some examples, the transmission scheme 300 may be an example of TDM transmission scheme. A UE 115 may transmit UCI 305 to multiple TRPs in one or more time resources (e.g., a symbol duration, a minislot duration, a slot duration, a subframe duration, a frame duration), as well as frequency resources (e.g., subcarriers, carriers) for a physical uplink channel, such as a PUCCH carrying the UCI 305. Additionally or alternatively, a UE 115 may transmit the UCI 305 to multiple TRPs in one or more time resources (e.g., a symbol duration, a minislot duration, a slot duration, a subframe duration, a frame duration), as well as frequency resources (e.g., subcarriers, carriers) for a physical uplink channel, such as a PUSCH, which may carry the UCI 305. One or more of the time resources and frequency resources may correspond to one or more frequency ranges, for example, an FR1 or an FR2, or a combination thereof.

In the example of FIG. 3, a single PUCCH resource 320 may carry the UCI 305. The same PUCCH resource 320 in one or more subsequent slots may carry a repetition of the UCI 305. For example, a UE 115 may transmit, to one base station 105 (e.g., a TRP), the UCI 305 during a slot 310 in a PUCCH resource 320. The UE 115 may then transmit, to another base station 105 (e.g., another TRP), the UCI 305 during a slot 315 in the same PUCCH resource 320. To enable transmission of the same UCI 305 to different base stations (e.g., different TRPs), the UE 115 may be configured with multiple different PUCCH spatial relation information per PUCCH resource for enhanced reliability for the uplink transmissions carrying the UCI 305. For example, the UE 115 may transmit, to one TRP, the UCI 305 during the slot 310 in the PUCCH resource 320 and according to PUCCH spatial relation information 325 (e.g., including power information, such as a first set of uplink power control parameters, with or without beam information as described herein). Additionally, the UE 115 may then transmit, to another TRP, the UCI 305 during the slot 315 in the same PUCCH resource 320 and according to PUCCH spatial relation information 330 (e.g., including other power information, such as a second set of uplink power control parameters, with or without beam information as described herein).

Figure 4:
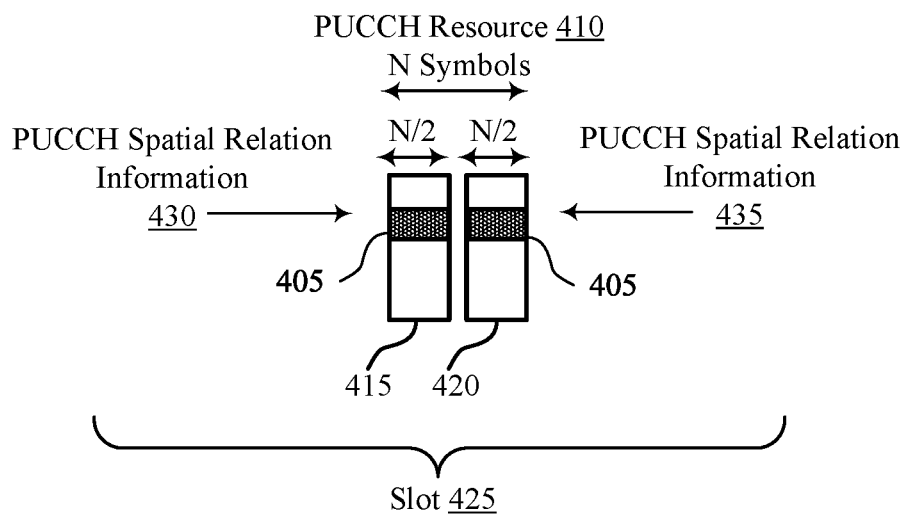
Figure 4:
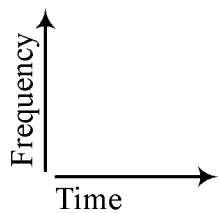
Figure 4:

FIG. 4 illustrates an example of a transmission scheme 400 that supports transmitting UCI on PUCCHs using different transmit powers in accordance with aspects of the present disclosure. The transmission scheme 400 may be implemented by aspects of the wireless communications systems 100 and 200 or may implement aspects of the wireless communications systems 100 and 200 as described with reference to FIGS. 1 and 2, respectively. For example, the transmission scheme 400 may be implemented by a UE 115, as described with reference to FIGS. 1 and 2. The transmission scheme 400 may be implemented by the UE 115 to transmit UCI to multiple TRPs using at least two uplink power control parameter sets to improve efficiency and promote higher reliability for the uplink transmissions carrying the UCI, among other benefits.

The transmission scheme 400 may represent a multi-TRP intra-slot repetition transmission scheme. In some examples, the transmission scheme 400 may be an example of TDM transmission scheme. A UE 115 may transmit UCI 405 to multiple TRPs in one or more time resources (e.g., a symbol duration, a minislot duration, a slot duration, a subframe duration, a frame duration), as well as frequency resources (e.g., subcarriers, carriers) for a physical uplink channel, such as a PUCCH carrying the UCI 405. Additionally or alternatively, a UE 115 may transmit the UCI 405 to multiple TRPs in one or more time resources (e.g., a symbol duration, a minislot duration, a slot duration, a subframe duration, a frame duration), as well as frequency resources (e.g., subcarriers, carriers) for a physical uplink channel, such as a PUSCH, which may carry the UCI 405. One or more of the time resources and frequency resources may correspond to one or more frequency ranges, for example, an FR1 or an FR2, or a combination thereof.

In the example of FIG. 4, a UE 115 may transmit the UCI 405 in a PUCCH resource 410, which may include different symbol periods (e.g., OFDM symbols) correspond to different uplink beams. For example, the PUCCH resource 410 may include N symbols. The N symbols may be split into a PUCCH symbol 415 and a PUCCH symbol 420, where the PUCCH symbol 415 may include half of the N symbols (e.g., N/2) and the PUCCH symbol 420 may include another half of the N symbols (e.g., N/2). The PUCCH symbol 415 and the PUCCH symbol 420 may be contiguous in a time domain. Alternatively, the PUCCH symbol 415 and the PUCCH symbol 420 may be noncontiguous in a time domain. A UE 115 may transmit, to one base station 105 (e.g., a TRP), the UCI 405 in the PUCCH symbol 415 associated with the PUCCH resource 410 during a slot 425. The UE 115 may then transmit, to another base station 105 (e.g., another TRP), the UCI 405 in the PUCCH symbol 420 associated with the PUCCH resource 410 during the slot 425.

To support transmission of the same UCI 405 to different TRPs (e.g., different base stations, access points, or other UEs), the UE 115 may be configured with multiple different PUCCH spatial relation information per PUCCH resource (e.g., per PUCCH symbol) for enhanced reliability for the uplink transmissions carrying the UCI 405. For example, the UE 115 may transmit, to one TRP, the UCI 405 in the PUCCH symbol 415 associated with the PUCCH resource 410 during the slot 425 and according to PUCCH spatial relation information 430 (e.g., including power information, such as a first set of uplink power control parameters, with or without beam information as described herein). Additionally, the UE 115 may then transmit, to another TRP, the UCI 405 in the PUCCH symbol 420 associated with the PUCCH resource 410 during the slot 425 and according to PUCCH spatial relation information 435 (e.g., including other power information, such as a second set of uplink power control parameters, with or without beam information as described herein). As such, different PUCCH symbols or sets of PUCCH symbols within a PUCCH resource, such as the PUCCH resource 410, may correspond to different uplink power control parameter sets.

Figure 5:
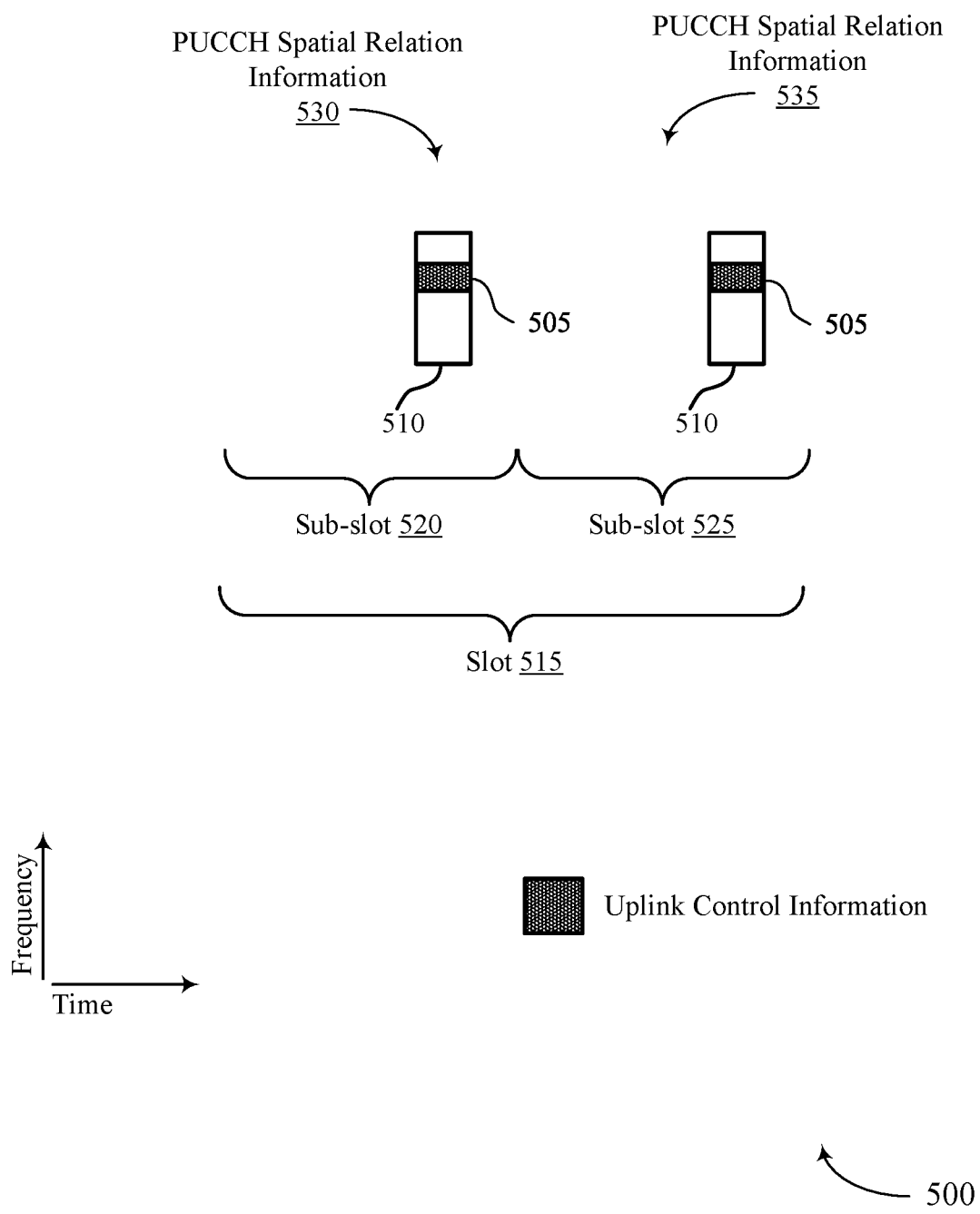

FIG. 5 illustrates an example of a transmission scheme 500 that supports transmitting UCI on PUCCHs using different transmit powers in accordance with aspects of the present disclosure. The transmission scheme 500 may be implemented by aspects of the wireless communications systems 100 and 200 or may implement aspects of the wireless communications systems 100 and 200 as described with reference to FIGS. 1 and 2, respectively. For example, the transmission scheme 500 may be implemented by a UE 115, as described with reference to FIGS. 1 and 2. The transmission scheme 500 may be implemented by the UE 115 to transmit UCI to multiple TRPs using at least two uplink power control parameters to improve efficiency and promote higher reliability for the uplink transmissions carrying the UCI, among other benefits.

The transmission scheme 500 may represent a multi-TRP intra-slot repetition transmission scheme. In some examples, the transmission scheme 500 may be an example of TDM transmission scheme. A UE 115 may transmit UCI 505 to multiple TRPs in one or more time resources (e.g., a symbol duration, a minislot duration, a slot duration, a subframe duration, a frame duration), as well as frequency resources (e.g., subcarriers, carriers) for a physical uplink channel, such as a PUCCH carrying the UCI 505. Additionally or alternatively, a UE 115 may transmit the UCI 505 to multiple TRPs in one or more time resources (e.g., a symbol duration, a minislot duration, a slot duration, a subframe duration, a frame duration), as well as frequency resources (e.g., subcarriers, carriers) for a physical uplink channel, such as a PUSCH, which may carry the UCI 505. One or more of the time resources and frequency resources may correspond to one or more frequency ranges, for example, an FR1 or an FR2, or a combination thereof.

In the example of FIG. 5, a single PUCCH resource 510 may carry the UCI 505. The same PUCCH resource 510 in one or more subsequent sub-slots may carry a repetition of the UCI 505. For example, a UE 115 may transmit, to one TRP (e.g., a base station, an access point, or another UE), the UCI 505 during a sub-slot 520 of a slot 515 in the PUCCH resource 510. The UE 115 may then transmit, to another TRP (e.g., another base station, another access point, or another UE), the UCI 505 during a sub-slot 525 of the slot 515 in the same PUCCH resource 510. Thus, one PUCCH resource carries UCI, and the same PUCCH resource in another one or more sub-slots within a slot carries a repetition of the UCI 505.

In some examples, to enable transmission of the same UCI 505 to different TRPs, the UE 115 may be configured with multiple different uplink power control parameter sets for enhanced reliability for the uplink transmissions carrying the UCI 505. For example, the UE 115 may transmit, to one TRP, the UCI 505 during the sub-slot 520 in the PUCCH resource 510 and according to PUCCH spatial relation information 530 (e.g., including power information, such as a first set of uplink power control parameters, with or without beam information as described herein). Additionally, the UE 115 may then transmit, to another TRP, the UCI 505 during the sub-slot 525 in the same PUCCH resource 510 and according to PUCCH spatial relation information 535 (e.g., including other power information, such as a second set of uplink power control parameters, with or without beam information as described herein).

Figure 6:
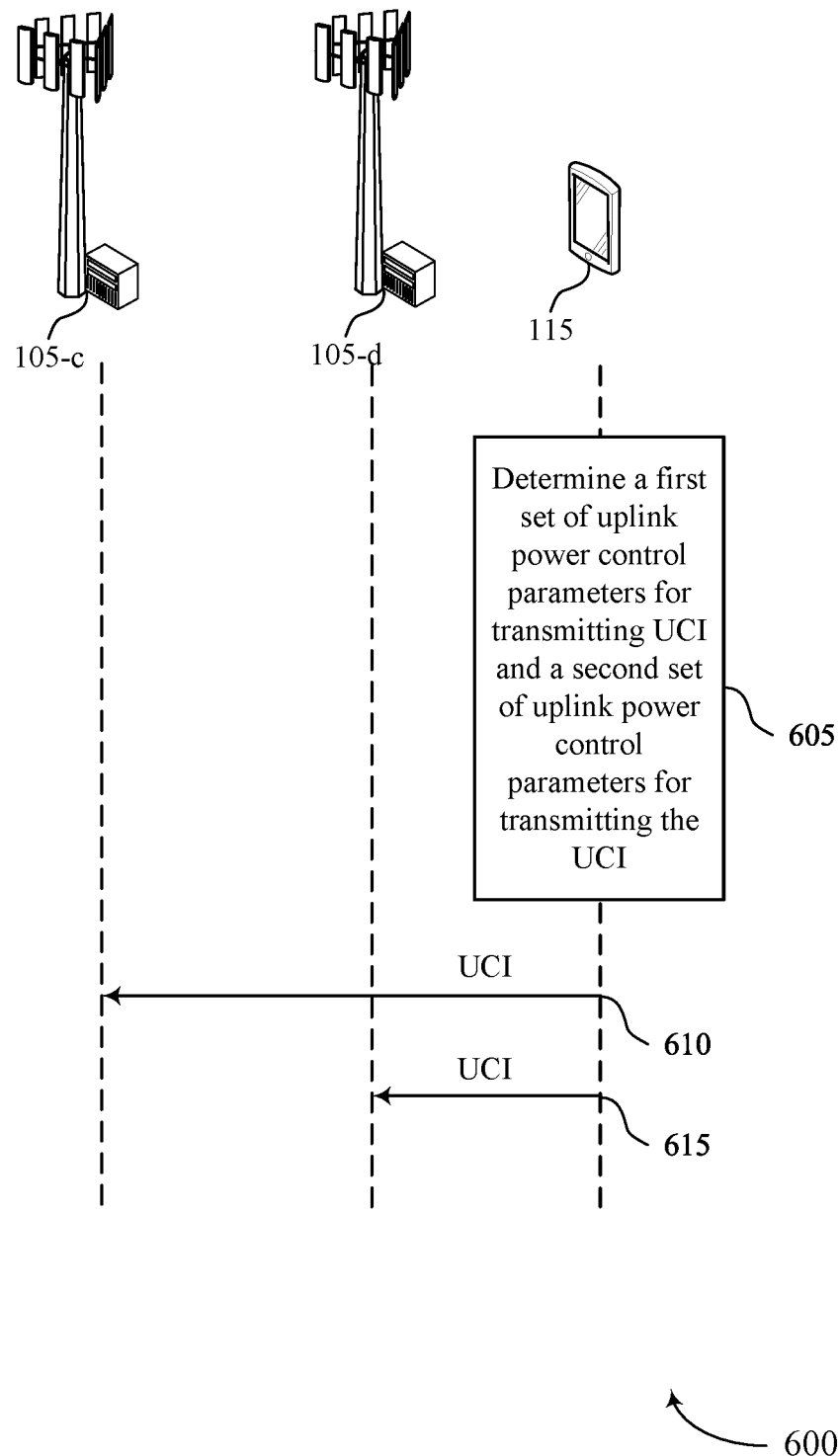
FIG. 6 illustrates an example of a process flow that supports transmitting UCI on PUCCHs using different transmit powers in accordance with aspects of the present disclosure.

FIG. 6 illustrates an example of a process flow 600 that supports transmitting UCI on PUCCHs using different transmit powers in accordance with aspects of the present disclosure. The process flow 600 may implement be implemented by aspects of the wireless communications systems 100 and 200 or may aspects of the wireless communications system 100 and 200 described with reference to FIGS. 1 and 2, respectively. For example, the process flow 600 may be based on a configuration by a TRP 105-*c*, a TRP 105-*d*, or a UE 115, and implemented by the UE 115. The TRPs 105 and the UE 115 may be examples of devices, as described herein. In the following description of the process flow 600, the operations between the TRPs 105 and the UE 115 may be transmitted in a different order than the example order shown, or the operations performed by the TRPs 105 and the UE 115 may be performed in different orders or at different times. Some operations may also be omitted from the process flow 600, and other operations may be added to the process flow 600.

At 605, the UE 115 may determine a first set of uplink power control parameters for transmitting UCI and a second set of uplink power control parameters for transmitting the UCI. In some examples, the UE 115 may receive message scheduling transmission, by the UE 115, of UCI in a PUCCH resource. The UE 115 may also receive an indication that the UE 115 is scheduled to transmit the UCI in the PUCCH resource to both the TRP 105-*c* and the TRP 105-*d*. Additionally, the UE 115 may receive the first set of uplink power control parameters and the second set of uplink power control parameters. The UE 115 may thereby determine the first set of uplink power control parameters for transmitting UCI to the TRP 105-*c* and the second set of uplink power control parameters for transmitting the UCI to the TRP 105-*d*.

In some examples, the UE 115 may receive signaling including a set of PUCCH spatial relation information and select at least two PUCCH spatial relation information from the set of PUCCH spatial relation information based on a MAC-CE message (e.g., receive from one of the TRPs 105 or another device (e.g., a base station)). The at least two PUCCH spatial relation information may include first PUCCH spatial relation information and second PUCCH spatial relation information. The UE 115 may determine the first set of uplink power control parameters and the second set of uplink power control parameters for the PUCCH resource based on the at least two PUCCH spatial relation information. In some examples, a set of uplink beam parameters might not be configured in the set of PUCCH spatial relation information. In some other examples, the UE 115 may refrain from applying a set of uplink beam parameters associated with the set of PUCCH spatial relation information. In other examples, a set of uplink beam parameters associated with the set of PUCCH spatial relation information might be nulled.

Additionally or alternatively, the UE 115 may receive an RRC message including one or more set of uplink power control parameters for the PUCCH resource as described herein. The UE 115 may then receive a MAC-CE message including a PUCCH resource identifier and one or more uplink power control parameter set identifiers, and the UE 115 may active the one or more set of uplink power control parameters for the PUCCH resource based on the PUCCH resource identifier and the one or more uplink power control parameter set identifiers. In some examples, the UE 115 may determine that each PUCCH resource associated with a PUCCH transmission (e.g., the UCI transmission) is configured with a single set of uplink power control parameters based on the RRC message. As such, the UE 115 may transmit the UCI to the TRP 105-c and the TRP 105-d based on the single set of uplink power control parameters. The single set may be a combined set including both the first set of uplink power control parameters and the second set of uplink power control parameters. Alternatively, the UE 115 may determine that each PUCCH resource associated with a PUCCH transmission (e.g., the UCI transmission) is configured with multiple set of uplink power control parameters based on the RRC message. The multiple set of uplink power control parameters may include the first set of uplink power control parameters and the second set of uplink power control parameters.

The UE 115 may determine the second set of uplink power control parameters based on the first set of uplink power control parameters. In some examples, the determination may be based on a set of uplink beam parameters including a reference signal index value. In some other examples, the determine may be based on an RRC configuration message. The RRC configuration message may be per serving cell and each PUCCH resource may be configured per the serving cell. In some other examples, the RRC configuration may be per BWP and each PUCCH resource may be configured per the BWP. The RRC configuration may be per PUCCH resource.

At 610, the UE 115 may transmit the UCI to the TRP 105-c in the PUCCH resource, based at least in part on the first set of uplink power control parameters, and without an uplink control channel beam indication (e.g., without uplink control channel beam hopping). At 615, the UE 115 may transmit the UCI to the TRP 105-d in the PUCCH resource, based at least in part on the second set of uplink power control parameters, and without an uplink control channel beam indication. In some examples, the UE 115 may transmit the UCI to the TRP 105-c and the TRP 105-d via one of intra-uplink control channel resource beam hopping, intra-slot repetition, or inter-slot repetition based on a number of repetitions associated with transmitting the UCI.

Figure 7:
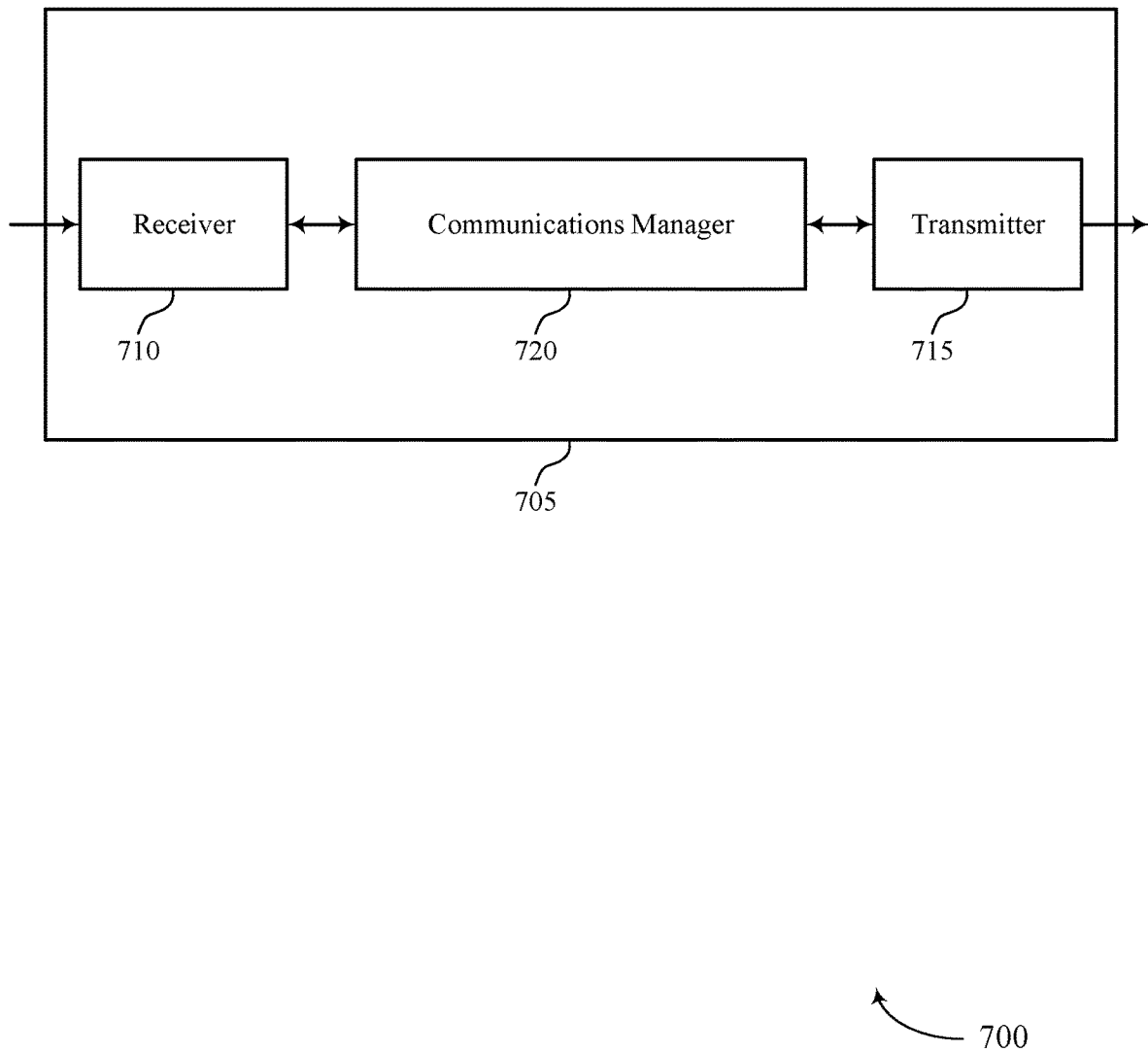
FIG. 7 and 8 show block diagrams of devices that support transmitting UCI on PUCCHs using different transmit powers in accordance with aspects of the present disclosure.

FIG. 7 shows a block diagram 700 of a device 705 that supports transmitting UCI on PUCCHs using different transmit powers in accordance with aspects of the present disclosure. The device 705 may be an example of aspects of a UE 115 as described herein. The device 705 may include a receiver 710, a transmitter 715, and a communications manager 720. The device 705 may also include at least one processor. Each of these components may be in communication with one another (e.g., via one or more buses).

The receiver 710 may provide a means for receiving information such as packets, user data, control information, or any combination thereof associated with various information channels (e.g., control channels, data channels, information channels related to transmitting UCI on PUCCHs using different transmit powers). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to transmitting UCI on PUCCHs using different transmit powers). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of transmitting UCI on PUCCHs using different transmit powers as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include at least one processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally or alternatively, in some examples, the communications manager 720, the receiver 710, the transmitter 715, or various combinations or components thereof may be implemented in code (e.g., as communications management software) executed by at least one processor. If implemented in code executed by the at least one processor, the functions of the communications manager 720, the receiver 710, the transmitter 715, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving a message scheduling transmission, by the UE, of UCI in a PUCCH resource. The communications manager 720 may be configured as or otherwise support a means for receiving an indication that the UE is scheduled to transmit the UCI in the PUCCH resource to both a first TRP and a second TRP. The communications manager 720 may be configured as or otherwise support a means for receiving a first set of uplink power control parameters for transmitting the UCI to the first TRP and a second set of uplink power control parameters for transmitting the UCI to the second TRP. The communications manager 720 may be configured as or otherwise support a means for transmitting the UCI to the first TRP and to the second TRP in the PUCCH resource, based at least in part on the first set of uplink power control parameters, and the second set of uplink power control parameters, and without an uplink control channel beam indication.

By including or configuring the communications manager 720 in accordance with examples as described herein, the device 705 (e.g., at least one processor controlling or otherwise coupled to the receiver 710, the transmitter 715, the communications manager 720, or a combination thereof) may support techniques for more efficient utilization of communication resources, as the device 705 may receive, via the receiver 710, reduced signaling that may include power information (e.g., uplink power control parameters) separate from beam information for multi-TRP PUCCH transmissions in FR1.

Figure 8:
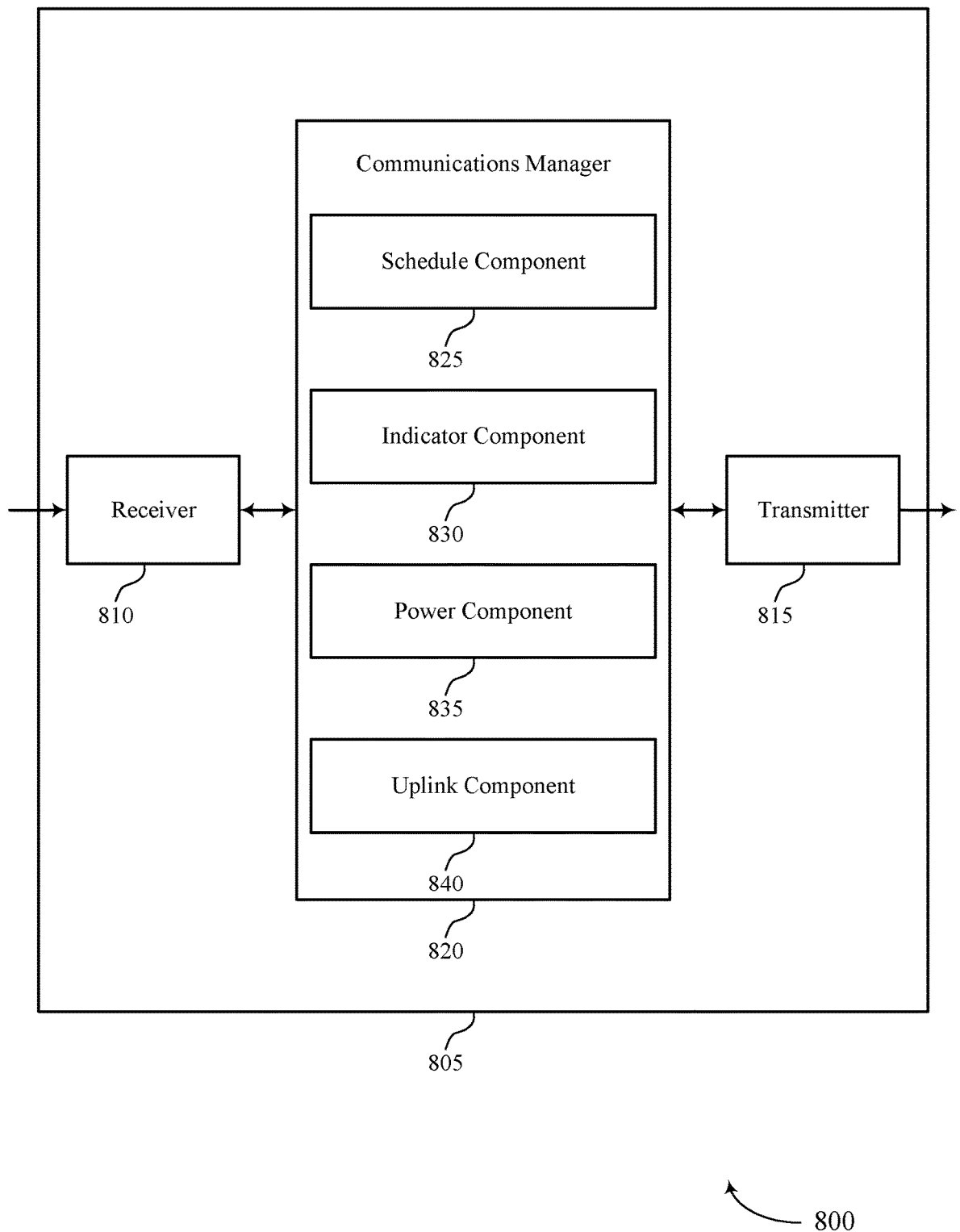

FIG. 8 shows a block diagram 800 of a device 805 that supports transmitting UCI on PUCCHs using different transmit powers in accordance with aspects of the present disclosure. The device 805 may be an example of aspects of a device 705 or a UE 115 as described herein. The device 805 may include a receiver 810, a transmitter 815, and a communications manager 820. The device 805 may also include at least one processor. Each of these components may be in communication with one another (e.g., via one or more buses).

The receiver 810 may provide a means for receiving information such as packets, user data, control information, or any combination thereof associated with various information channels (e.g., control channels, data channels, information channels related to transmitting UCI on PUCCHs using different transmit powers). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to transmitting UCI on PUCCHs using different transmit powers). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of transmitting UCI on PUCCHs using different transmit powers as described herein. For example, the communications manager 820 may include a schedule component 825, an indicator component 830, a power component 835, an uplink component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The schedule component 825 may be configured as or otherwise support a means for receiving a message scheduling transmission, by the UE, of UCI in a PUCCH resource. The indicator component 830 may be configured as or otherwise support a means for receiving an indication that the UE is scheduled to transmit the UCI in the PUCCH resource to both a first TRP and a second TRP. The power component 835 may be configured as or otherwise support a means for receiving a first set of uplink power control parameters for transmitting the UCI to the first TRP and a second set of uplink power control parameters for transmitting the UCI to the second TRP. The uplink component 840 may be configured as or otherwise support a means for transmitting the UCI to the first TRP and to the second TRP in the PUCCH resource, based at least in part on the first set of uplink power control parameters, and the second set of uplink power control parameters, and without an uplink control channel beam indication.

Figure 9:
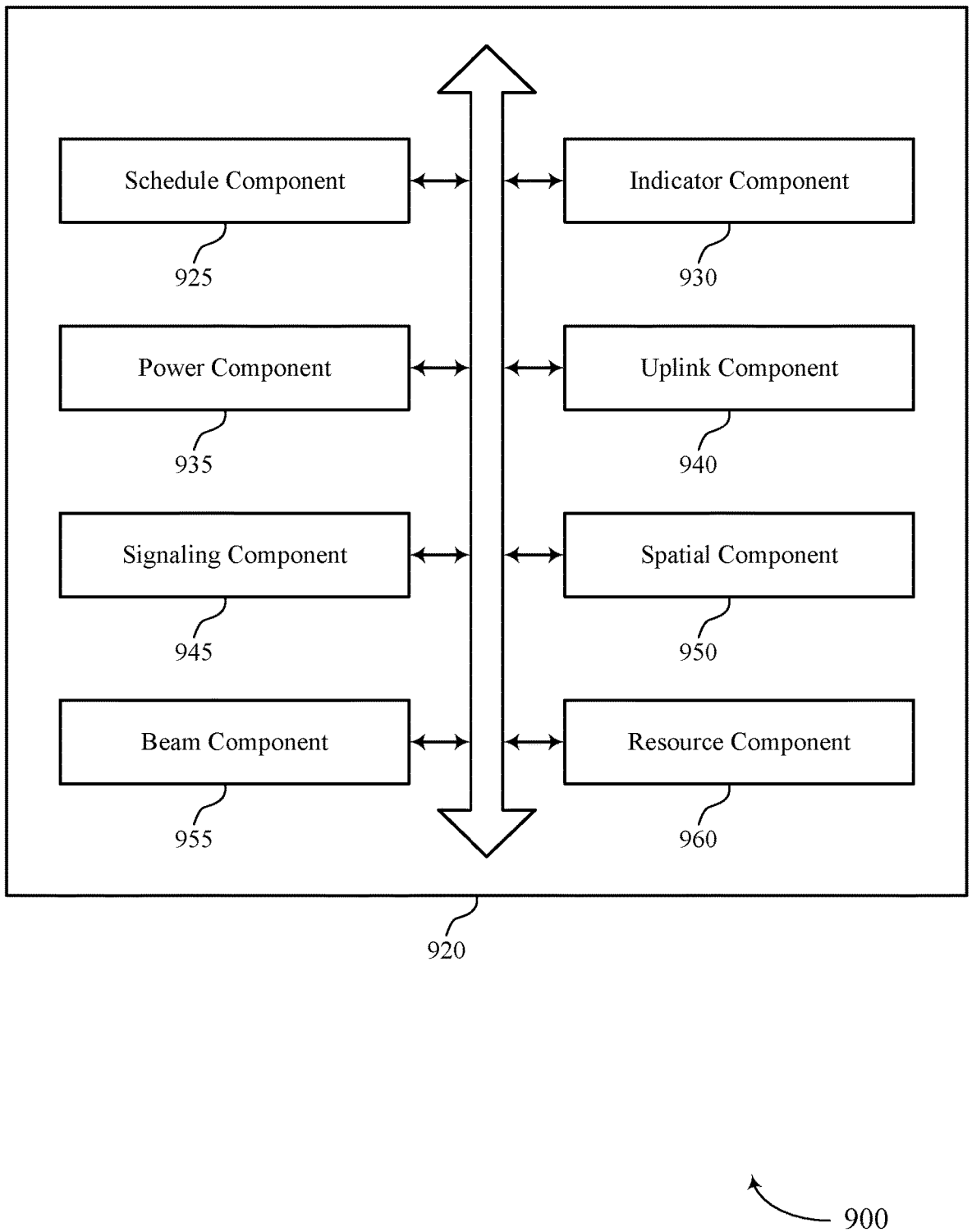
FIG. 9 shows a block diagram of a communications manager that supports transmitting UCI on PUCCHs using different transmit powers in accordance with aspects of the present disclosure.

FIG. 9 shows a block diagram 900 of a communications manager 920 that supports transmitting UCI on PUCCHs using different transmit powers in accordance with aspects of the present disclosure. The communications manager 920 may be an example of aspects of a communications manager 720, a communications manager 820, or both, as described herein. The communications manager 920, or various components thereof, may be an example of means for performing various aspects of transmitting UCI on PUCCHs using different transmit powers as described herein. For example, the communications manager 920 may include a schedule component 925, an indicator component 930, a power component 935, an uplink component 940, a signaling component 945, a spatial component 950, a beam component 955, a resource component 960, or any combination thereof. Each of these components may communicate, directly or indirectly, with one another (e.g., via one or more buses).

The communications manager 920 may support wireless communication at a UE in accordance with examples as disclosed herein. The schedule component 925 may be configured as or otherwise support a means for receiving a message scheduling transmission, by the UE, of UCI in a PUCCH resource. The indicator component 930 may be configured as or otherwise support a means for receiving an indication that the UE is scheduled to transmit the UCI in the PUCCH resource to both a first TRP and a second TRP. The power component 935 may be configured as or otherwise support a means for receiving a first set of uplink power control parameters for transmitting the UCI to the first TRP and a second set of uplink power control parameters for transmitting the UCI to the second TRP. The uplink component 940 may be configured as or otherwise support a means for transmitting the UCI to the first TRP and to the second TRP in the PUCCH resource, based at least in part on the first set of uplink power control parameters, and the second set of uplink power control parameters, and without an uplink control channel beam indication.

The signaling component 945 may be configured as or otherwise support a means for receiving signaling including a set of PUCCH spatial relation information. In some examples, the spatial component 950 may be configured as or otherwise support a means for selecting at least two PUCCH spatial relation information from the set of PUCCH spatial relation information based on a MAC-CE message, the at least two PUCCH spatial relation information including first PUCCH spatial relation information and second PUCCH spatial relation information. In some examples, the power component 935 may be configured as or otherwise support a means for determining the first set of uplink power control parameters and the second set of uplink power control parameters for the PUCCH resource based on the at least two PUCCH spatial relation information.

A set of uplink beam parameters, in some examples, is not configured in the set of PUCCH spatial relation information. In some examples, the beam component 955 may be configured as or otherwise support a means for refraining from applying a set of uplink beam parameters associated with the set of PUCCH spatial relation information. In some examples, a set of uplink beam parameters associated with the set of PUCCH spatial relation information is nulled. In some examples, a set of uplink beam parameters includes an SSB parameter, a CSI-RS parameter, or an SRS parameter, or a combination thereof.

The signaling component 945 may be configured as or otherwise support a means for receiving a RRC message including one or more set of uplink power control parameters for the PUCCH resource, based at least in part on where each set of the one or more set of uplink power control parameters includes an uplink power control parameter set identifier, a PUCCH power index value, a PLRS index value, or a closed loop index value, or a combination thereof. In some examples, the signaling component 945 may be configured as or otherwise support a means for receiving a MAC-CE message including a PUCCH resource identifier and one or more uplink power control parameter set identifiers. In some examples, the power component 935 may be configured as or otherwise support a means for activating the one or more set of uplink power control parameters for the PUCCH resource based on the PUCCH resource identifier and the one or more uplink power control parameter set identifiers.

In some examples, the resource component 960 may be configured as or otherwise support a means for determining that each PUCCH resource associated with a PUCCH transmission is configured with a single set of uplink power control parameters based on the RRC message. In some examples, the uplink component 940 may be configured as or otherwise support a means for transmitting the UCI to the first TRP and to the second TRP based on the single set of uplink power control parameters. In some examples, the resource component 960 may be configured as or otherwise support a means for determining that each PUCCH resource associated with a PUCCH transmission is configured with multiple set of uplink power control parameters based on the RRC message. The multiple set of uplink power control parameters includes the first set of uplink power control parameters and the second set of uplink power control parameters.

The power component 935 may be configured as or otherwise support a means for determining the first set of uplink power control parameters including a first PUCCH power index value, a first PLRS index value, or a first closed loop index value, or a combination thereof. In some examples, the power component 935 may be configured as or otherwise support a means for determining the second set of uplink power control parameters based on the first set of uplink power control parameters, the second set of uplink power control parameters including a second PUCCH power index value, a second PLRS index value, or a second closed loop index value, or a combination thereof. In some examples, determining the second set of uplink power control parameters is based on a set of uplink beam parameters including a reference signal index value.

In some examples, determining the second set of uplink power control parameters is based on an RRC configuration. In some examples, the RRC configuration is per serving cell and each PUCCH resource is configured per the serving cell. In some examples, the RRC configuration is per BWP and each PUCCH resource is configured per the BWP. In some examples, the RRC configuration is per PUCCH resource. In some examples, to support transmitting the UCI, the uplink component 940 may be configured as or otherwise support a means for transmitting the UCI to the first TRP and to the second TRP via one of intra-uplink control channel resource beam hopping, intra-slot repetition, or inter-slot repetition based on a number of repetitions associated with transmitting the UCI.

Figure 10:
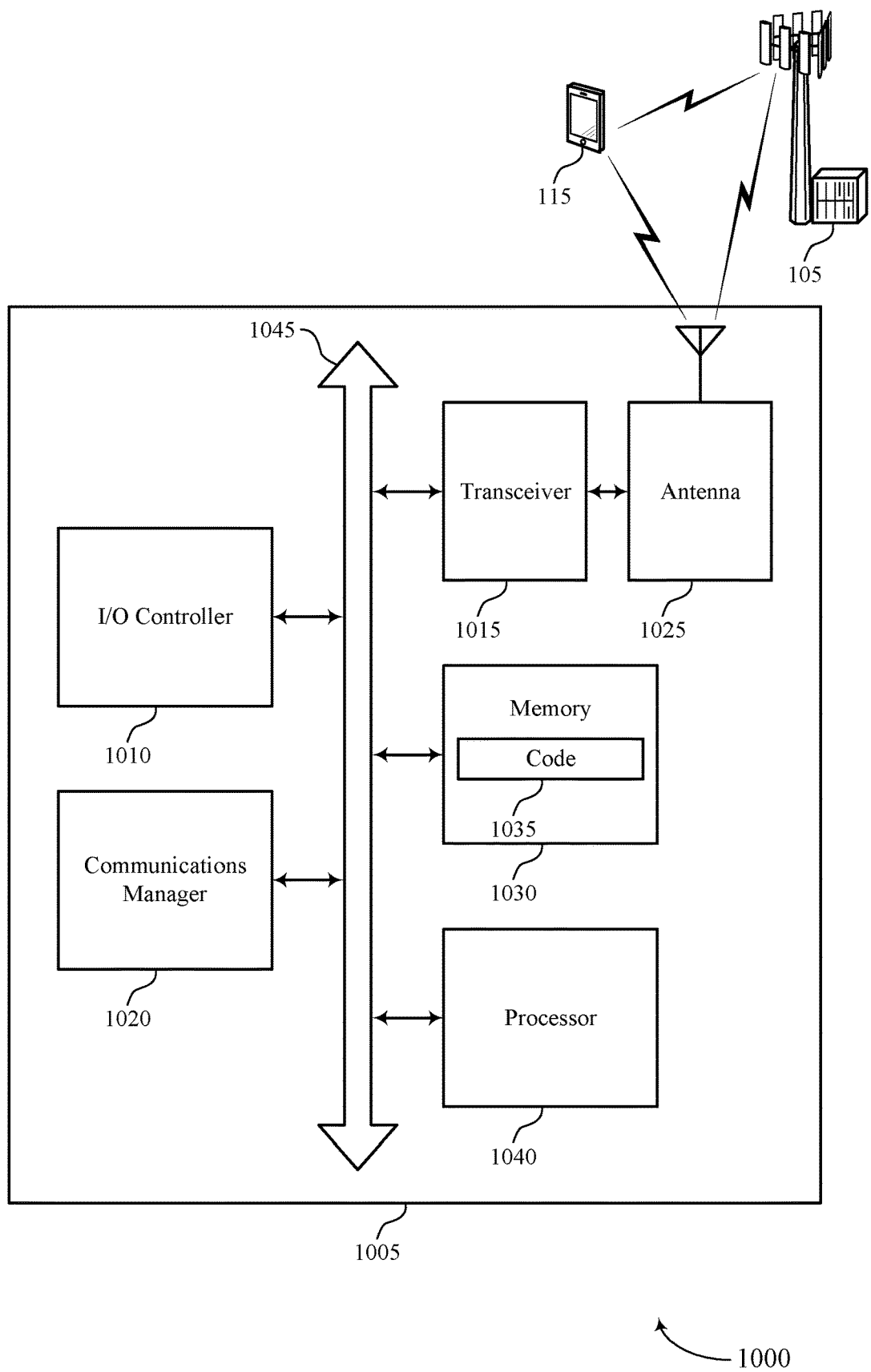
FIG. 10 shows a diagram of a system including a device that supports transmitting UCI on PUCCHs using different transmit powers in accordance with aspects of the present disclosure.

FIG. 10 shows a diagram of a system 1000 including a device 1005 that supports transmitting UCI on PUCCHs using different transmit powers in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of at least one processor, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the memory 1030) to cause the device 1005 to perform various functions (e.g., functions or tasks supporting transmitting UCI on PUCCHs using different transmit powers). For example, the device 1005 or a component of the device 1005 may include the at least one processor 1040 and memory 1030 coupled to the at least one processor 1040, the at least one processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving a message scheduling transmission, by the UE, of UCI in a PUCCH resource. The communications manager 1020 may be configured as or otherwise support a means for receiving an indication that the UE is scheduled to transmit the UCI in the PUCCH resource to both a first TRP and a second TRP. The communications manager 1020 may be configured as or otherwise support a means for receiving a first set of uplink power control parameters for transmitting the UCI to the first TRP and a second set of uplink power control parameters for transmitting the UCI to the second TRP. The communications manager 1020 may be configured as or otherwise support a means for transmitting the UCI to the first TRP and to the second TRP in the PUCCH resource, based at least in part on the first set of uplink power control parameters, and the second set of uplink power control parameters, and without an uplink control channel beam indication. By including or configuring the communications manager 1020 in accordance with examples as described herein, the device 1005 may support techniques for more efficient utilization of communication resources and improved coordination between devices, as the communications manager 1020 may facilitate one or mechanisms in FR1 for signaling power information (e.g., PUCCH transmit power parameters) separate from beam information for multi-TRP PUCCH transmission.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the memory 1030, the code 1035, or any combination thereof. For example, the code 1035 may include instructions executable by the at least one processor 1040 to cause the device 1005 to perform various aspects of transmitting UCI on PUCCHs using different transmit powers as described herein, or the at least one processor 1040 and the memory 1030 may be otherwise configured to perform or support such operations.

Figure 11:
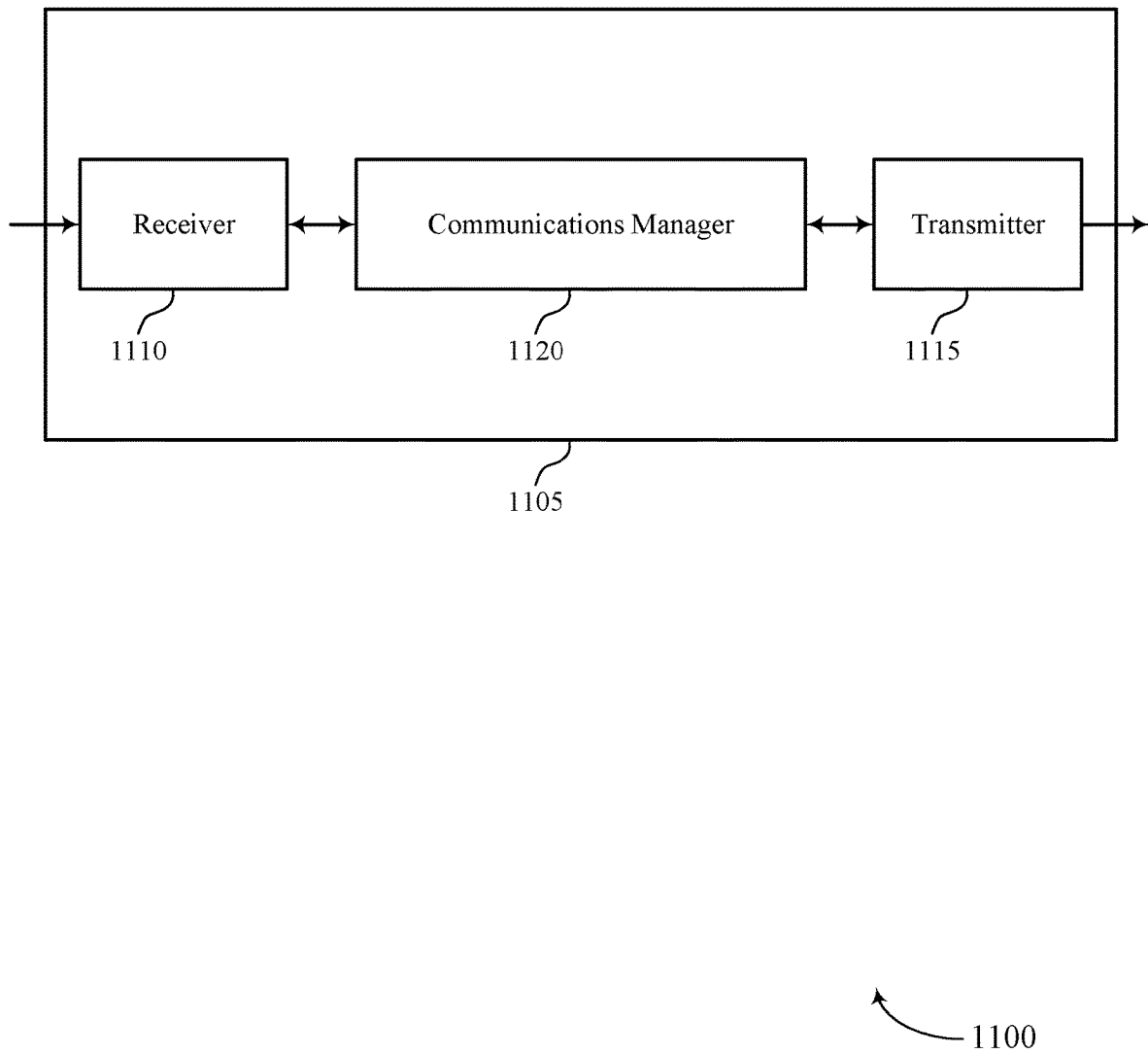
FIGS. 11 and 12 show block diagrams of devices that support transmitting UCI on PUCCHs using different transmit powers in accordance with aspects of the present disclosure.

FIG. 11 shows a block diagram 1100 of a device 1105 that supports transmitting UCI on PUCCHs using different transmit powers in accordance with aspects of the present disclosure. The device 1105 may be an example of aspects of a base station 105 as described herein. The device 1105 may include a receiver 1110, a transmitter 1115, and a communications manager 1120. The device 1105 may also include at least one processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to transmitting UCI on PUCCHs using different transmit powers). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to transmitting UCI on PUCCHs using different transmit powers). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of transmitting UCI on PUCCHs using different transmit powers as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry).

The hardware may include at least one processor, a DSP, an ASIC, an FPGA or other programmable logic device, a discrete gate or transistor logic, discrete hardware components, or any combination thereof configured as or otherwise supporting a means for performing the functions described in the present disclosure. In some examples, the at least one processor and memory coupled with the at least one processor may be configured to perform one or more of the functions described herein (e.g., by executing, by the at least one processor, instructions stored in the memory).

Additionally or alternatively, in some examples, the communications manager 1120, the receiver 1110, the transmitter 1115, or various combinations or components thereof may be implemented in code (e.g., as communications management software) executed by at least one processor. If implemented in code executed by the at least one processor, the functions of the communications manager 1120, the receiver 1110, the transmitter 1115, or various combinations or components thereof may be performed by a general-purpose processor, a DSP, a CPU, a GPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first TRP in accordance with examples as disclosed herein. For example, the communications manager 1120 may be configured as or otherwise support a means for transmitting a message scheduling transmission, by a UE, of UCI in a PUCCH resource. The communications manager 1120 may be configured as or otherwise support a means for transmitting an indication that the UE is scheduled to transmit the UCI in the PUCCH resource to both the first TRP and a second TRP. The communications manager 1120 may be configured as or otherwise support a means for transmitting a first set of uplink power control parameters for the UE to transmit the UCI to the first TRP and a second set of uplink power control parameters for the UE to transmit the UCI to the second TRP. The communications manager 1120 may be configured as or otherwise support a means for receiving the UCI in the PUCCH resource, based at least in part on the first set of uplink power control parameters, and without an uplink control channel beam indication. By including or configuring the communications manager 1120 in accordance with examples as described herein, the device 1105 (e.g., at least one processor controlling or otherwise coupled to the receiver 1110, the transmitter 1115, the communications manager 1120, or a combination thereof) may support techniques for more efficient utilization of communication resources.

Figure 12:
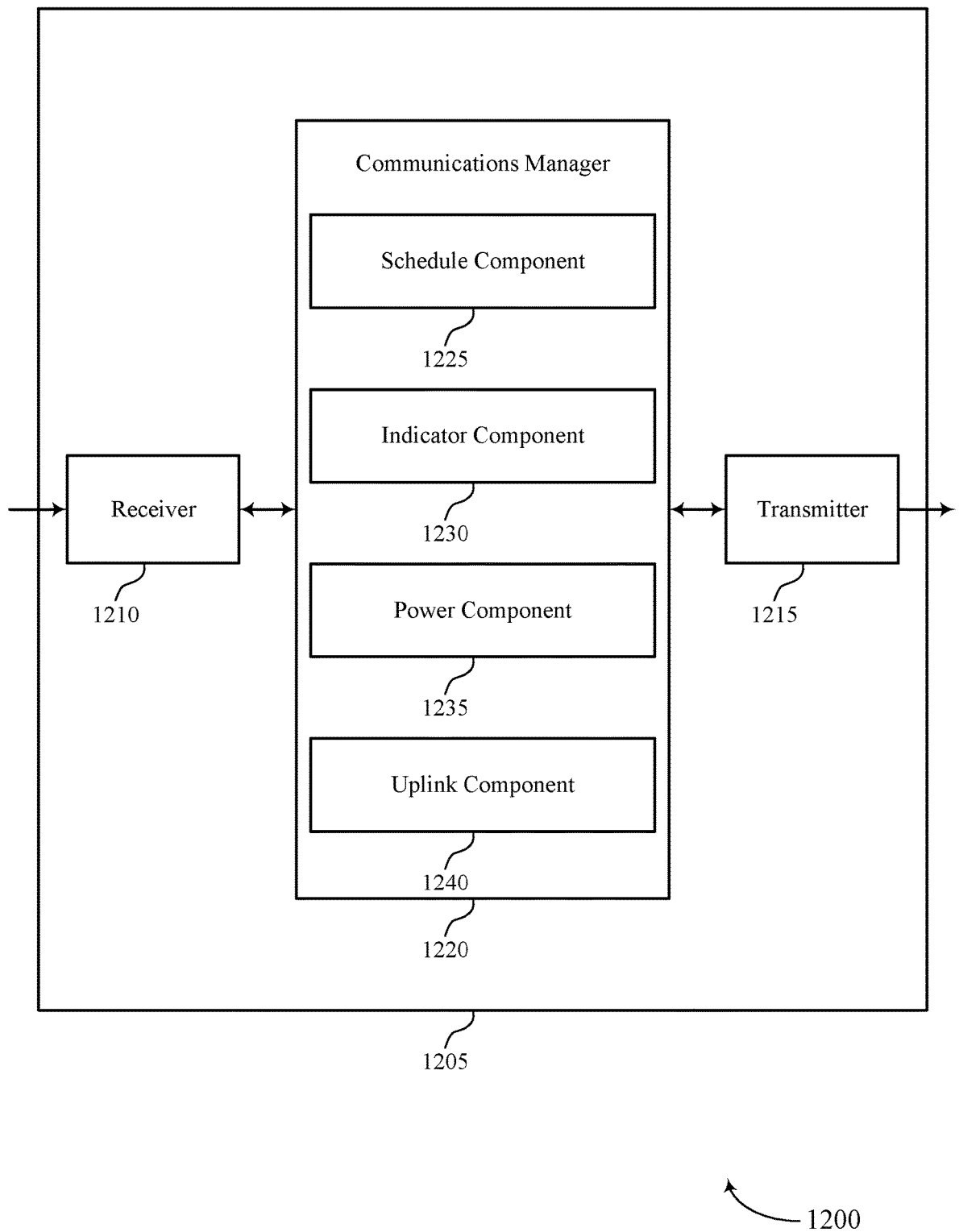

FIG. 12 shows a block diagram 1200 of a device 1205 that supports transmitting UCI on PUCCHs using different transmit powers in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include at least one processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to transmitting UCI on PUCCHs using different transmit powers). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to transmitting UCI on PUCCHs using different transmit powers). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of transmitting UCI on PUCCHs using different transmit powers as described herein. For example, the communications manager 1220 may include a schedule component 1225, an indicator component 1230, a power component 1235, an uplink component 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a first TRP in accordance with examples as disclosed herein. The schedule component 1225 may be configured as or otherwise support a means for transmitting a message scheduling transmission, by a UE, of UCI in a PUCCH resource. The indicator component 1230 may be configured as or otherwise support a means for transmitting an indication that the UE is scheduled to transmit the UCI in the PUCCH resource to both the first TRP and a second TRP. The power component 1235 may be configured as or otherwise support a means for transmitting a first set of uplink power control parameters for the UE to transmit the UCI to the first TRP and a second set of uplink power control parameters for the UE to transmit the UCI to the second TRP. The uplink component 1240 may be configured as or otherwise support a means for receiving the UCI in the PUCCH resource, based at least in part on the first set of uplink power control parameters, and without an uplink control channel beam indication.

Figure 13:
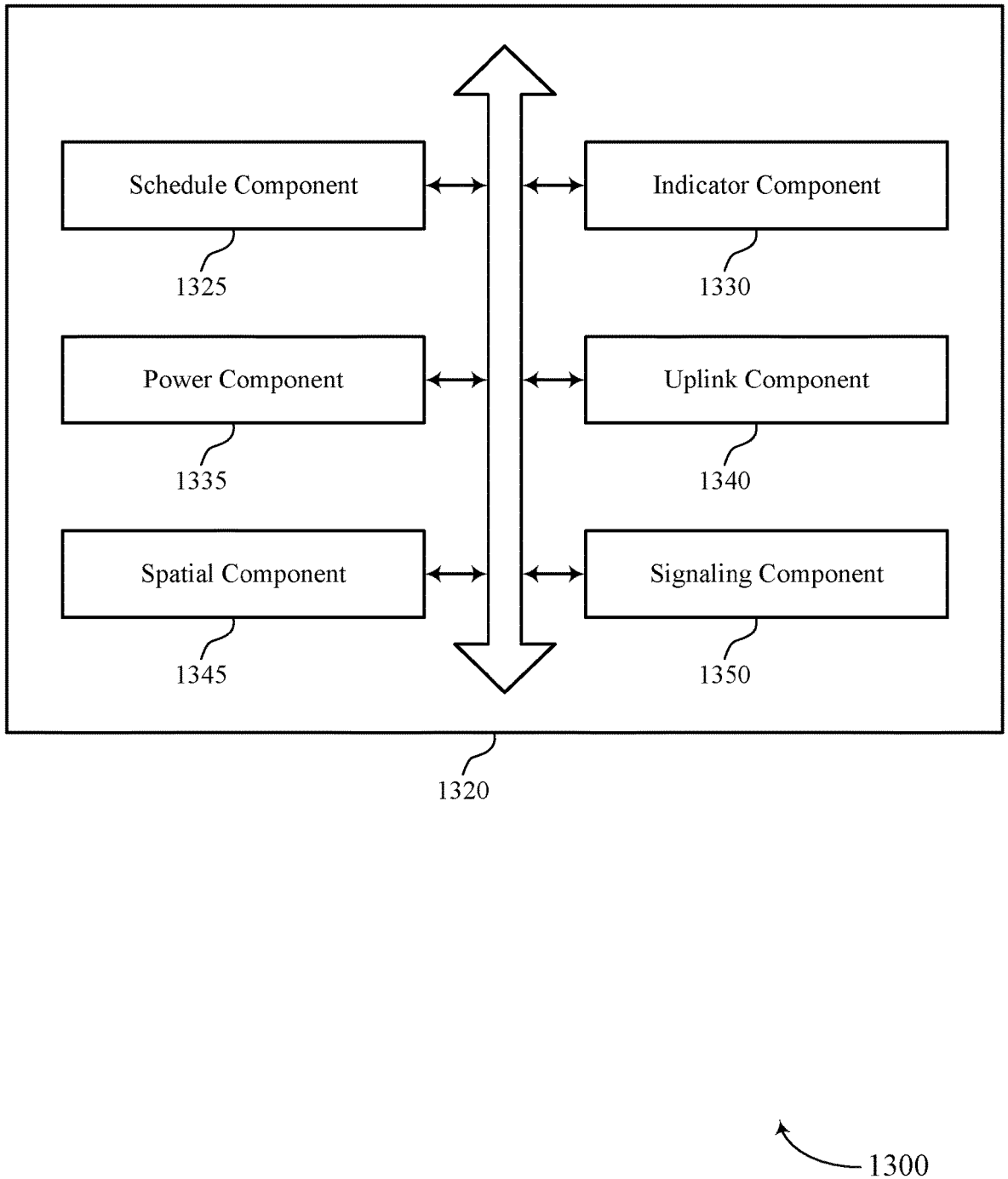
FIG. 13 shows a block diagram of a communications manager that supports transmitting UCI on PUCCHs using different transmit powers in accordance with aspects of the present disclosure.

FIG. 13 shows a block diagram 1300 of a communications manager 1320 that supports transmitting UCI on PUCCHs using different transmit powers in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of transmitting UCI on PUCCHs using different transmit powers as described herein. For example, the communications manager 1320 may include a schedule component 1325, an indicator component 1330, a power component 1335, an uplink component 1340, a spatial component 1345, a signaling component 1350, or any combination thereof. Each of these components may communicate, directly or indirectly, with one another (e.g., via one or more buses).

The communications manager 1320 may support wireless communication at a first TRP in accordance with examples as disclosed herein. The schedule component 1325 may be configured as or otherwise support a means for transmitting a message scheduling transmission, by a UE, of UCI in a PUCCH resource. The indicator component 1330 may be configured as or otherwise support a means for transmitting an indication that the UE is scheduled to transmit the UCI in the PUCCH resource to both the first TRP and a second TRP. The power component 1335 may be configured as or otherwise support a means for transmitting a first set of uplink power control parameters for the UE to transmit the UCI to the first TRP and a second set of uplink power control parameters for the UE to transmit the UCI to the second TRP. The uplink component 1340 may be configured as or otherwise support a means for receiving the UCI in the PUCCH resource, based at least in part on the first set of uplink power control parameters, and without an uplink control channel beam indication.

The spatial component 1345 may be configured as or otherwise support a means for transmitting a set of PUCCH spatial relation information, where a set of uplink beam parameters is not configured in the set of PUCCH spatial relation information. In some examples, the set of uplink beam parameters in the set of PUCCH spatial relation information is nulled. In some examples, the set of uplink beam parameters includes an SSB parameter, a CSI-RS parameter, or an SRS parameter, or a combination thereof.

In some examples, the signaling component 1350 may be configured as or otherwise support a means for transmitting a RRC message including one or more set of uplink power control parameters for the PUCCH resource, where each set of the one or more set of uplink power control parameters includes an uplink power control parameter set identifier, a PUCCH power index value, a PLRS index value, or a closed loop index value, or a combination thereof. In some examples, the signaling component 1350 may be configured as or otherwise support a means for transmitting a MAC-CE message including a PUCCH resource identifier and one or more uplink power control parameter set identifiers, where the MAC-CE message activates the one or more set of uplink power control parameters for the PUCCH resource based on the PUCCH resource identifier and the one or more uplink power control parameter set identifiers. In some examples, each PUCCH resource of a set of PUCCH resources is configured with a single set of uplink power control parameters based on the RRC message. In some examples, each PUCCH resource of a set of PUCCH resources is configured with multiple set of uplink power control parameters based on the RRC message.

Figure 14:
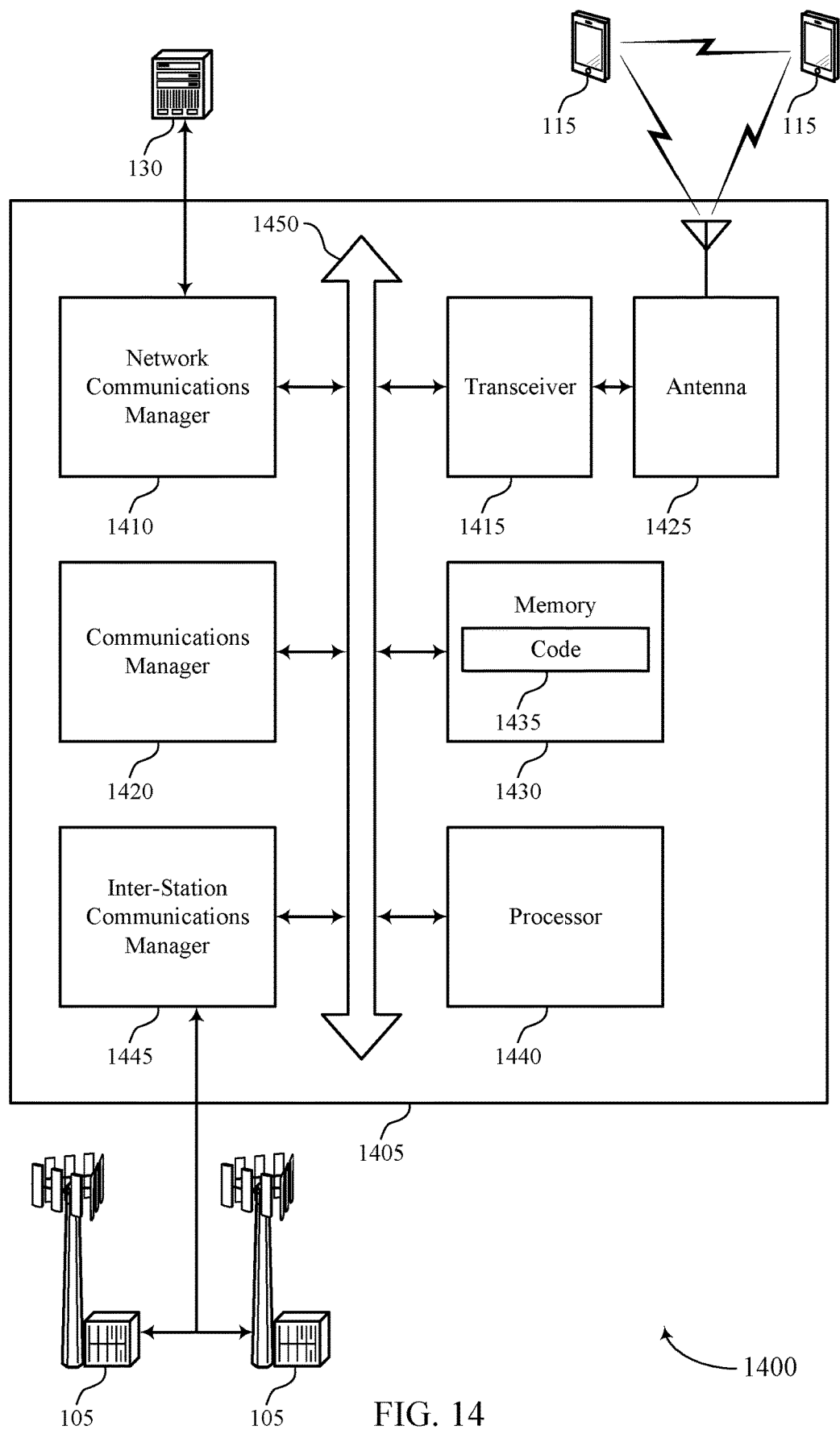
FIG. 14 shows a diagram of a system including a device that supports transmitting UCI on PUCCHs using different transmit powers in accordance with aspects of the present disclosure.

FIG. 14 shows a diagram of a system 1400 including a device 1405 that supports transmitting UCI on PUCCHs using different transmit powers in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, at least one processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the at least one processor 1440, cause the device 1405 to perform various functions described herein. The code 1435 may be stored in a non-transitory computer-readable medium such as system memory or another type of memory. In some cases, the code 1435 may not be directly executable by the at least one processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The at least one processor 1440 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the at least one processor 1440 may be configured to operate a memory array using a memory controller. In some other cases, a memory controller may be integrated into the at least one processor 1440. The at least one processor 1440 may be configured to execute computer-readable instructions stored in a memory (e.g., the memory 1430) to cause the device 1405 to perform various functions (e.g., functions or tasks supporting transmitting UCI on PUCCHs using different transmit powers). For example, the device 1405 or a component of the device 1405 may include the at least one processor 1440 and memory 1430 coupled to the at least one processor 1440, the at least one processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a first TRP in accordance with examples as disclosed herein. For example, the communications manager 1420 may be configured as or otherwise support a means for transmitting a message scheduling transmission, by a UE, of UCI in a PUCCH resource. The communications manager 1420 may be configured as or otherwise support a means for transmitting an indication that the UE is scheduled to transmit the UCI in the PUCCH resource to both the first TRP and a second TRP. The communications manager 1420 may be configured as or otherwise support a means for transmitting a first set of uplink power control parameters for the UE to transmit the UCI to the first TRP and a second set of uplink power control parameters for the UE to transmit the UCI to the second TRP. The communications manager 1420 may be configured as or otherwise support a means for receiving the UCI in the PUCCH resource, based at least in part on the first set of uplink power control parameters, and without an uplink control channel beam indication. By including or configuring the communications manager 1420 in accordance with examples as described herein, the device 1405 may support techniques for efficient utilization of communication resources and improved coordination between devices.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the at least one processor 1440, the memory 1430, the code 1435, or any combination thereof. For example, the code 1435 may include instructions executable by the at least one processor 1440 to cause the device 1405 to perform various aspects of transmitting UCI on PUCCHs using different transmit powers as described herein, or the at least one processor 1440 and the memory 1430 may be otherwise configured to perform or support such operations.

Figure 15:
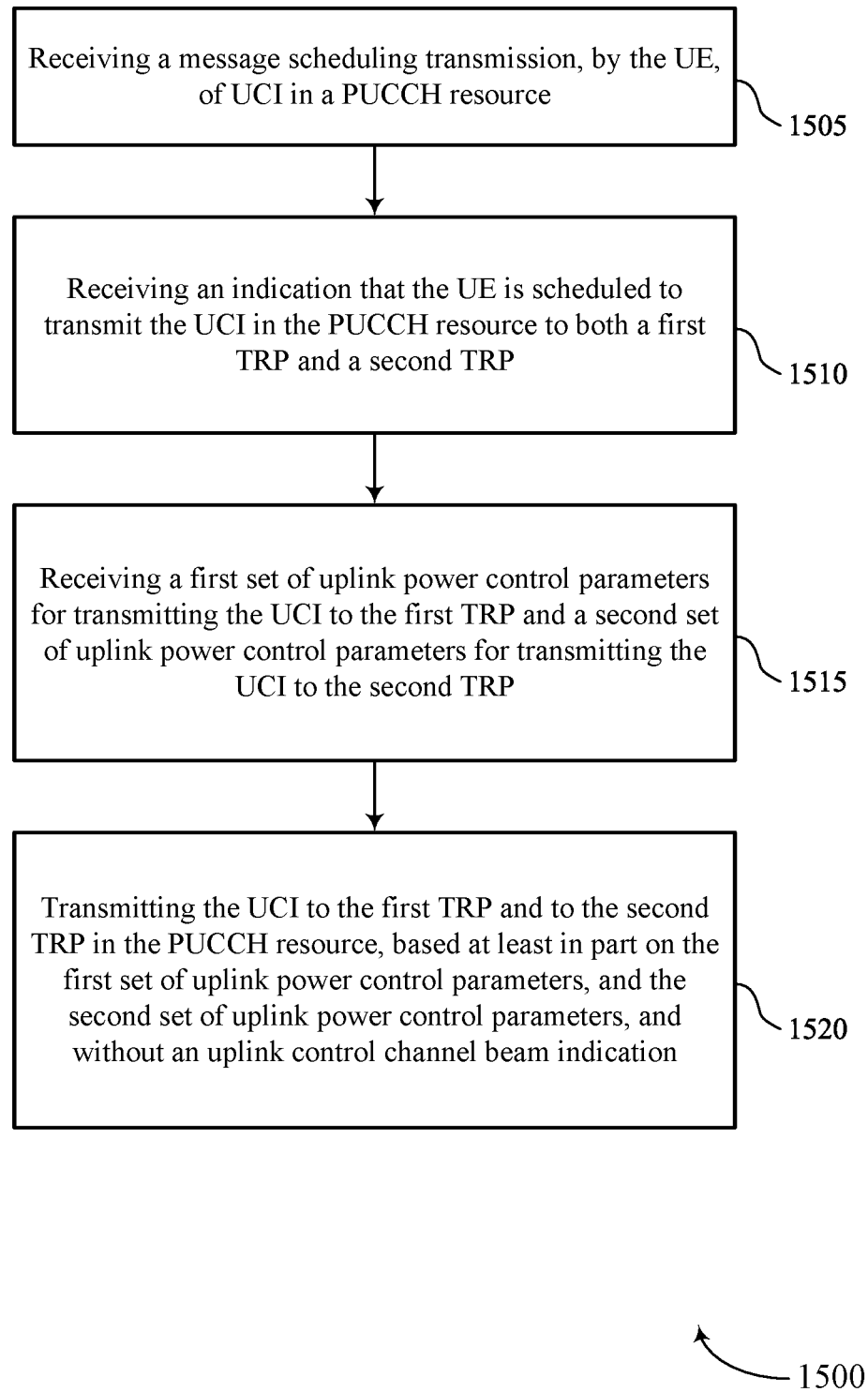
FIGS. 15 through 18 show flowcharts illustrating methods that support transmitting UCI on PUCCHs using different transmit powers in accordance with aspects of the present disclosure.

FIG. 15 shows a flowchart illustrating a method 1500 that supports transmitting UCI on PUCCHs using different transmit powers in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving a message scheduling transmission, by the UE, of UCI in a PUCCH resource. The operations of 1505 may be performed in accordance with examples as disclosed herein. In some examples, aspects of the operations of 1505 may be performed by a schedule component 925 as described with reference to FIG. 9.

At 1510, the method may include receiving an indication that the UE is scheduled to transmit the UCI in the PUCCH resource to both a first TRP and a second TRP. The operations of 1510 may be performed in accordance with examples as disclosed herein. In some examples, aspects of the operations of 1510 may be performed by an indicator component 930 as described with reference to FIG. 9.

At 1515, the method may include receiving a first set of uplink power control parameters for transmitting the UCI to the first TRP and a second set of uplink power control parameters for transmitting the UCI to the second TRP. The operations of 1515 may be performed in accordance with examples as disclosed herein. In some examples, aspects of the operations of 1515 may be performed by a power component 935 as described with reference to FIG. 9.

At 1520, the method may include transmitting the UCI to the first TRP and to the second TRP in the PUCCH resource, based at least in part on the first set of uplink power control parameters, and the second set of uplink power control parameters, and without an uplink control channel beam indication. The operations of 1520 may be performed in accordance with examples as disclosed herein. In some examples, aspects of the operations of 1520 may be performed by an uplink component 940 as described with reference to FIG. 9.

Figure 16:
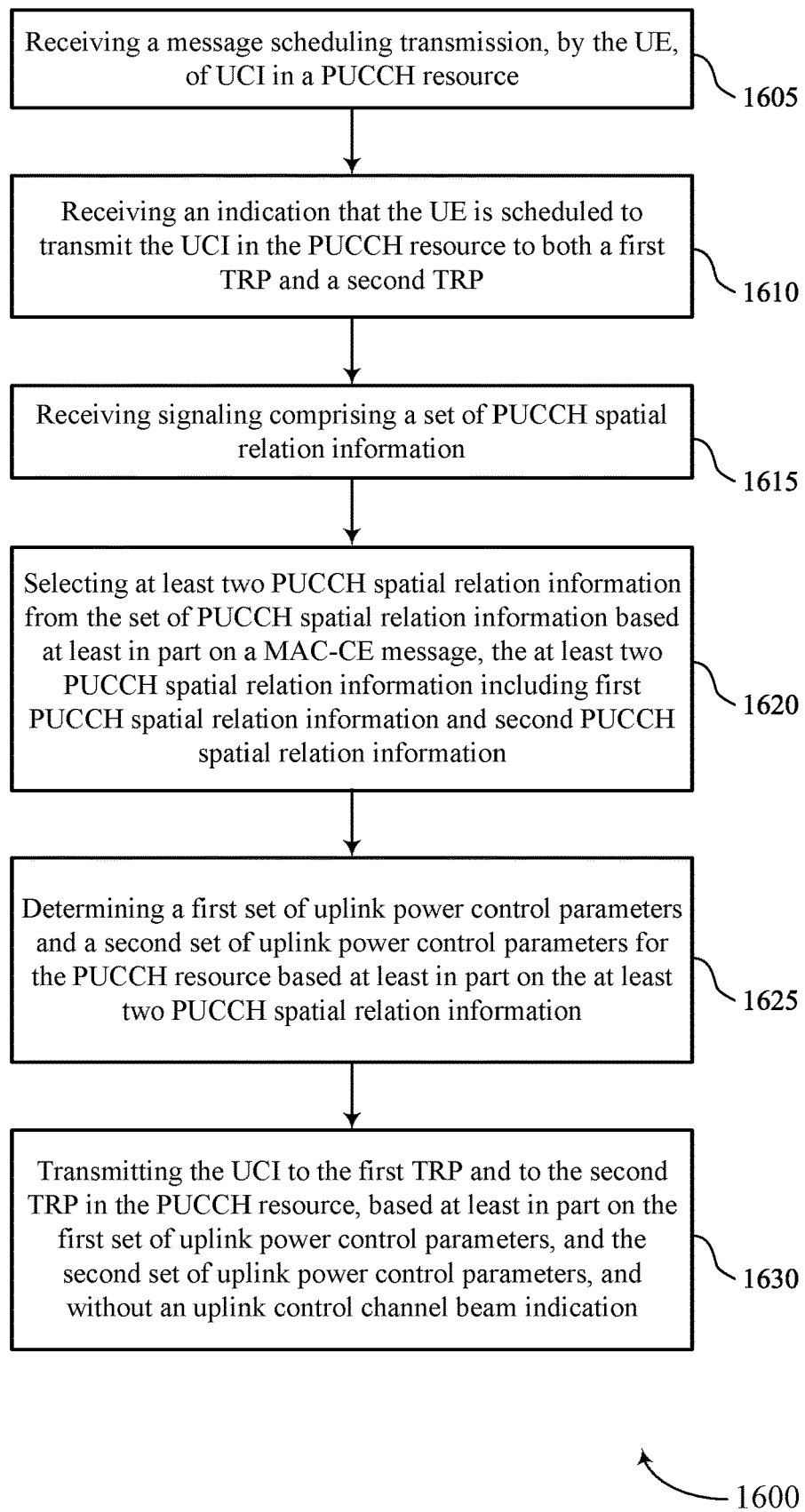

FIG. 16 shows a flowchart illustrating a method 1600 that supports transmitting UCI on PUCCHs using different transmit powers in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving a message scheduling transmission, by the UE, of UCI in a PUCCH resource. The operations of 1605 may be performed in accordance with examples as disclosed herein. In some examples, aspects of the operations of 1605 may be performed by a schedule component 925 as described with reference to FIG. 9.

At 1610, the method may include receiving an indication that the UE is scheduled to transmit the UCI in the PUCCH resource to both a first TRP and a second TRP. The operations of 1610 may be performed in accordance with examples as disclosed herein. In some examples, aspects of the operations of 1610 may be performed by an indicator component 930 as described with reference to FIG. 9.

At 1615, the method may include receiving signaling comprising a set of PUCCH spatial relation information. The operations of 1615 may be performed in accordance with examples as disclosed herein. In some examples, aspects of the operations of 1615 may be performed by a signaling component 945 as described with reference to FIG. 9.

At 1620, the method may include selecting at least two PUCCH spatial relation information from the set of PUCCH spatial relation information based at least in part on a MAC-CE message, the at least two PUCCH spatial relation information including first PUCCH spatial relation information and second PUCCH spatial relation information. The operations of 1620 may be performed in accordance with examples as disclosed herein. In some examples, aspects of the operations of 1620 may be performed by a spatial component 950 as described with reference to FIG. 9.

At 1625, the method may include determining a first set of uplink power control parameters and a second set of uplink power control parameters for the PUCCH resource based at least in part on the at least two PUCCH spatial relation information. The operations of 1625 may be performed in accordance with examples as disclosed herein. In some examples, aspects of the operations of 1625 may be performed by a power component 935 as described with reference to FIG. 9.

At 1630, the method may include transmitting the UCI to the first TRP and to the second TRP in the PUCCH resource, based at least in part on the first set of uplink power control parameters, and the second set of uplink power control parameters, and without an uplink control channel beam indication. The operations of 1630 may be performed in accordance with examples as disclosed herein. In some examples, aspects of the operations of 1630 may be performed by an uplink component 940 as described with reference to FIG. 9.

Figure 17:
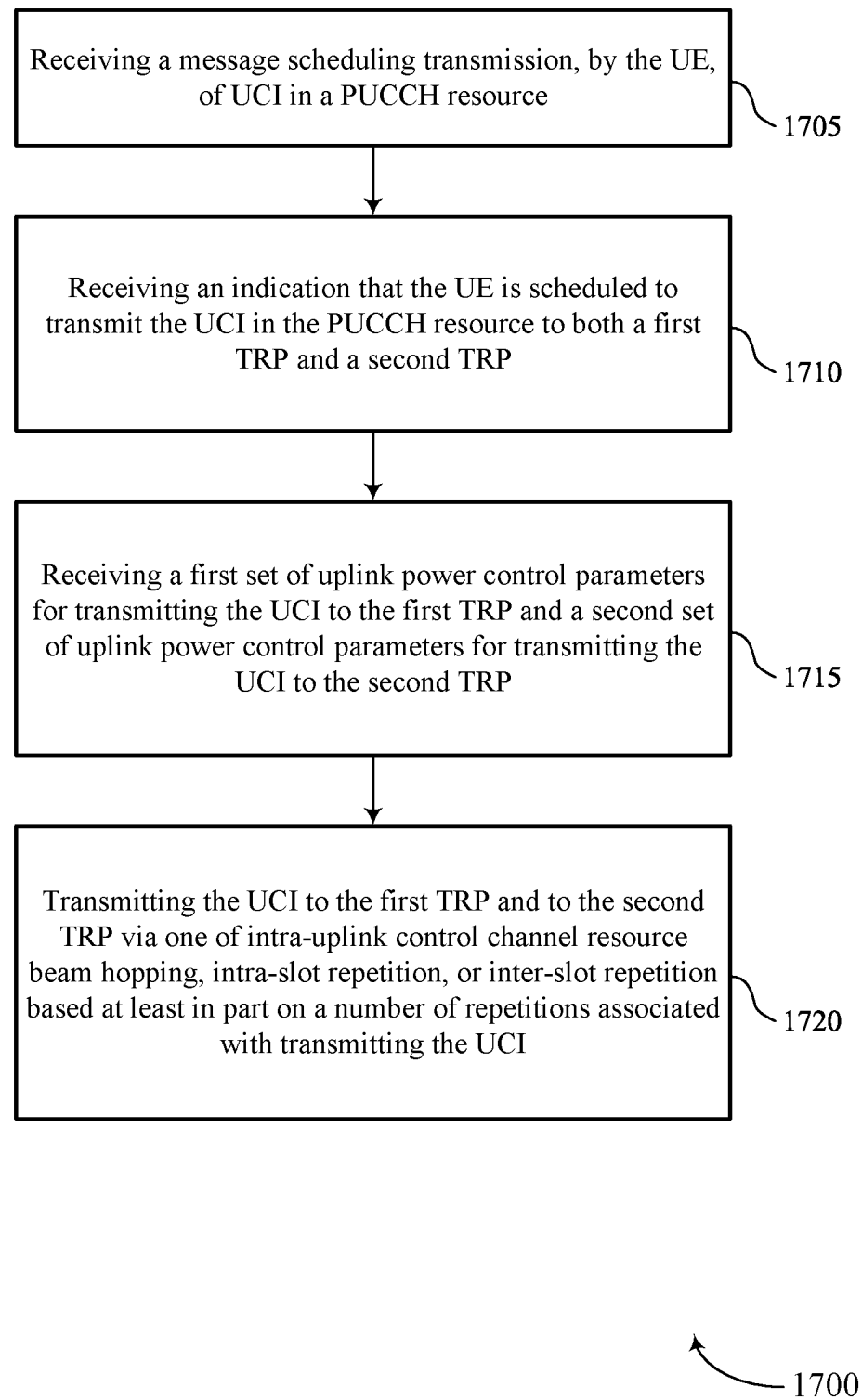

FIG. 17 shows a flowchart illustrating a method 1700 that supports transmitting UCI on PUCCHs using different transmit powers in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving a message scheduling transmission, by the UE, of UCI in a PUCCH resource. The operations of 1705 may be performed in accordance with examples as disclosed herein. In some examples, aspects of the operations of 1705 may be performed by a schedule component 925 as described with reference to FIG. 9.

At 1710, the method may include receiving an indication that the UE is scheduled to transmit the UCI in the PUCCH resource to both a first TRP and a second TRP. The operations of 1710 may be performed in accordance with examples as disclosed herein. In some examples, aspects of the operations of 1710 may be performed by an indicator component 930 as described with reference to FIG. 9.

At 1715, the method may include receiving a first set of uplink power control parameters for transmitting the UCI to the first TRP and a second set of uplink power control parameters for transmitting the UCI to the second TRP. The operations of 1715 may be performed in accordance with examples as disclosed herein. In some examples, aspects of the operations of 1715 may be performed by a power component 935 as described with reference to FIG. 9.

At 1720, the method may include transmitting the UCI to the first TRP and to the second TRP via one of intra-uplink control channel resource beam hopping, intra-slot repetition, or inter-slot repetition based at least in part on a number of repetitions associated with transmitting the UCI. The operations of 1720 may be performed in accordance with examples as disclosed herein. In some examples, aspects of the operations of 1720 may be performed by an uplink component 940 as described with reference to FIG. 9.

Figure 18:
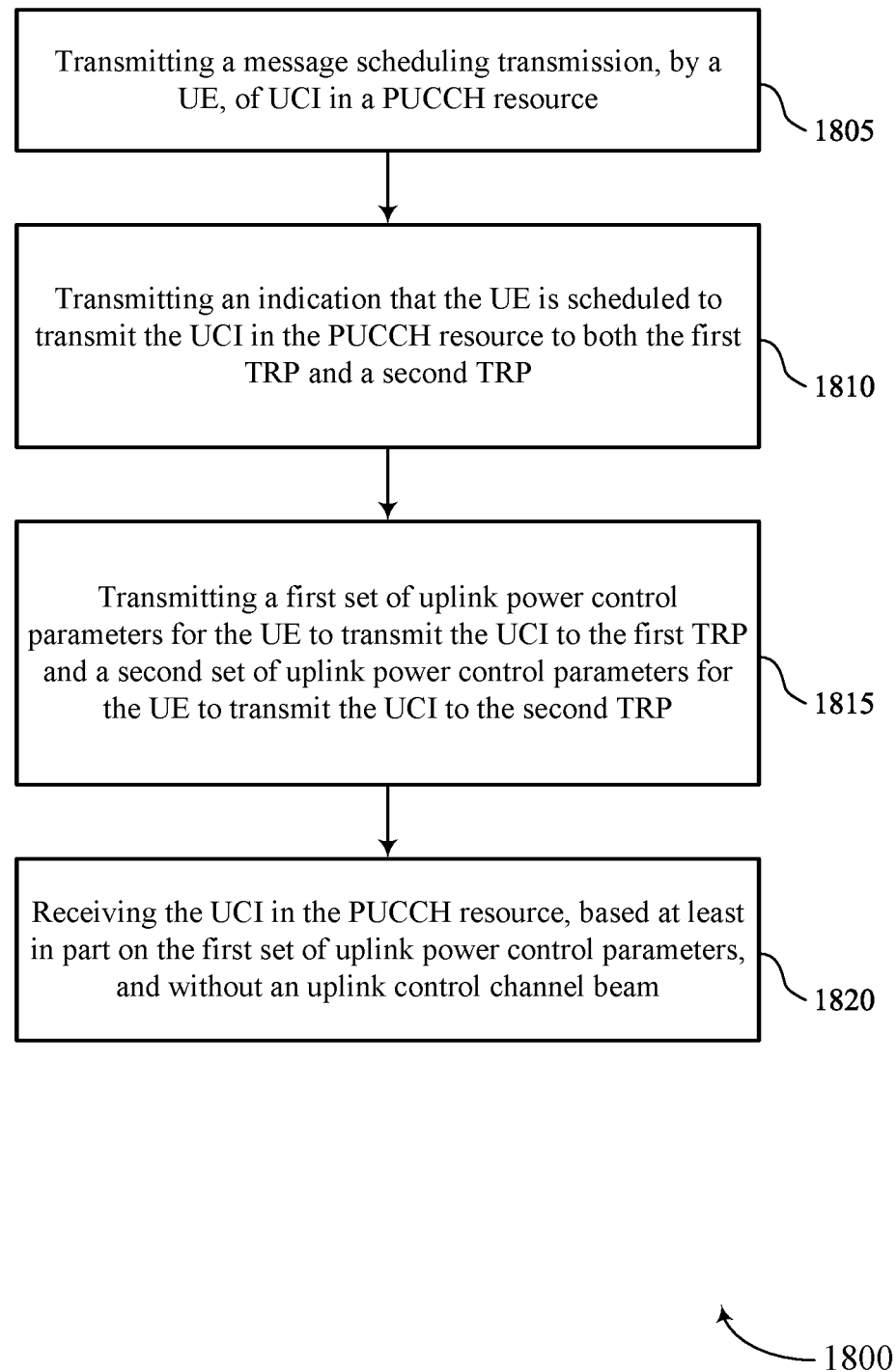

FIG. 18 shows a flowchart illustrating a method 1800 that supports transmitting UCI on PUCCHs using different transmit powers in accordance with aspects of the present disclosure. The operations of the method 1800 may be implemented by a base station or its components as described herein. For example, the operations of the method 1800 may be performed by a base station 105 (also referred to as a TRP) as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting a message scheduling transmission, by a UE, of UCI in a PUCCH resource. The operations of 1805 may be performed in accordance with examples as disclosed herein. In some examples, aspects of the operations of 1805 may be performed by a schedule component 1325 as described with reference to FIG. 13.

At 1810, the method may include transmitting an indication that the UE is scheduled to transmit the UCI in the PUCCH resource to both the first TRP and a second TRP. The operations of 1810 may be performed in accordance with examples as disclosed herein. In some examples, aspects of the operations of 1810 may be performed by an indicator component 1330 as described with reference to FIG. 13.

At 1815, the method may include transmitting a first set of uplink power control parameters for the UE to transmit the UCI to the first TRP and a second set of uplink power control parameters for the UE to transmit the UCI to the second TRP. The operations of 1815 may be performed in accordance with examples as disclosed herein. In some examples, aspects of the operations of 1815 may be performed by a power component 1335 as described with reference to FIG. 13.

At 1820, the method may include receiving the UCI in the PUCCH resource, based at least in part on the first set of uplink power control parameters, and without an uplink control channel beam indication. The operations of 1820 may be performed in accordance with examples as disclosed herein. In some examples, aspects of the operations of 1820 may be performed by an uplink component 1340 as described with reference to FIG. 13.

The following provides an overview of aspects of the present disclosure:

Aspect 1: A method for wireless communication at a UE, comprising: receiving a message scheduling transmission, by the UE, of UCI in a PUCCH resource; receiving an indication that the UE is scheduled to transmit the UCI in the resource to both a first TRP and a second TRP; receiving a first set of uplink power control parameters for transmitting the UCI to the first TRP and a second set of uplink power control parameters for transmitting the UCI to the second TRP; and transmitting the UCI to the first TRP and to the second TRP in the PUCCH resource, based at least in part on the first set of uplink power control parameters, and the second set of uplink power control parameters, and without an uplink control channel beam indication.

Aspect 2: The method of aspect 1, further comprising: receiving signaling comprising a set of PUCCH spatial relation information; selecting at least two PUCCH spatial relation information from the set of PUCCH spatial relation information based at least in part on a MAC-CE message, the at least two PUCCH spatial relation information comprising first PUCCH spatial relation information and second PUCCH spatial relation information; and determining the first set of uplink power control parameters and the second set of uplink power control parameters for the PUCCH resource based at least in part on the at least two PUCCH spatial relation information.

Aspect 3: The method of aspect 2, wherein a set of uplink beam parameters is not configured in the set of PUCCH spatial relation information.

Aspect 4: The method of any of aspects 2 through 3, further comprising: refraining from applying a set of uplink beam parameters associated with the set of PUCCH spatial relation information.

Aspect 5: The method of any of aspects 2 through 4, wherein a set of uplink beam parameters associated with the set of PUCCH spatial relation information is nulled.

Aspect 6: The method of any of aspects 2 through 5, wherein a set of uplink beam parameters comprises an SSB parameter, a CSI-RS parameter, or an SRS parameter, or a combination thereof.

Aspect 7: The method of any of aspects 1 through 6, further comprising: receiving an RRC message comprising one or more set of uplink power control parameters for the PUCCH resource, wherein each set of the one or more set of uplink power control parameters comprises an uplink power control parameter set identifier, a PUCCH power index value, a PLRS index value, or a closed loop index value, or a combination thereof.

Aspect 8: The method of aspect 7, further comprising: receiving a MAC-CE message comprising a PUCCH resource identifier and one or more uplink power control parameter set identifiers; and activating the one or more set of uplink power control parameters for the PUCCH resource based at least in part on the PUCCH resource identifier and the one or more uplink power control parameter set identifiers.

Aspect 9: The method of any of aspects 7 through 8, further comprising: determining that each PUCCH resource associated with a PUCCH transmission is configured with a single set of uplink power control parameters based at least in part on the RRC message; and transmitting the UCI to the first TRP and to the second TRP based at least in part on the single set of uplink power control parameters.

Aspect 10: The method of any of aspects 7 through 9, further comprising: determining that each PUCCH resource associated with a PUCCH transmission is configured with multiple set of uplink power control parameters based at least in part on the RRC message, wherein the multiple set of uplink power control parameters comprises the first set of uplink power control parameters and the second set of uplink power control parameters.

Aspect 11: The method of any of aspects 1 through 10, further comprising: determining the first set of uplink power control parameters comprising a first PUCCH power index value, a first PLRS index value, or a first closed loop index value, or a combination thereof and determining the second set of uplink power control parameters based at least in part on the first set of uplink power control parameters, the second set of uplink power control parameters comprising a second PUCCH power index value, a second PLRS index value, or a second closed loop index value, or a combination thereof.

Aspect 12: The method of aspect 11, wherein determining the second set of uplink power control parameters is based at least in part on a set of uplink beam parameters comprising a reference signal index value.

Aspect 13: The method of any of aspects 11 through 12, wherein determining the second set of uplink power control parameters is based at least in part on an RRC configuration.

Aspect 14: The method of aspect 13, wherein the RRC configuration is per serving cell and each PUCCH resource is configured per the serving cell.

Aspect 15: The method of any of aspects 13 through 14, wherein the RRC configuration is per BWP and each PUCCH resource is configured per the BWP.

Aspect 16: The method of any of aspects 13 through 15, wherein the RRC configuration is per PUCCH resource.

Aspect 17: The method of any of aspects 1 through 16, wherein transmitting the UCI comprises: transmitting the UCI to the first TRP and to the second TRP via one of intra-uplink control channel resource beam hopping, intra-slot repetition, or inter-slot repetition based at least in part on a number of repetitions associated with transmitting the UCI.

Aspect 18: A method for wireless communication at a first TRP, comprising: transmitting a message scheduling transmission, by a UE, of UCI in a PUCCH resource; transmitting an indication that the UE is scheduled to transmit the UCI in the PUCCH resource to both the first TRP and a second TRP; transmitting a first set of uplink power control parameters for the UE to transmit the UCI to the first TRP and a second set of uplink power control parameters for the UE to transmit the UCI to the second TRP; and receiving the UCI in the PUCCH resource, based at least in part on the first set of uplink power control parameters, and without an uplink control channel beam indication.

Aspect 19: The method of aspect 18, further comprising: transmitting a set of PUCCH spatial relation information, wherein a set of uplink beam parameters is not configured in the set of PUCCH spatial relation information.

Aspect 20: The method of aspect 19, wherein the set of uplink beam parameters in the set of PUCCH spatial relation information is nulled.

Aspect 21: The method of any of aspects 19 through 20, wherein the set of uplink beam parameters comprises an SSB parameter, a CSI-RS parameter, or an SRS parameter, or a combination thereof.

Aspect 22: The method of any of aspects 19 through 21, further comprising: transmitting an RRC message comprising one or more set of uplink power control parameters for the PUCCH resource, wherein each set of the one or more set of uplink power control parameters comprises an uplink power control parameter set identifier, a PUCCH power index value, a PLRS index value, or a closed loop index value, or a combination thereof.

Aspect 23: The method of aspect 22, further comprising: transmitting a MAC-CE message comprising a PUCCH resource identifier and one or more uplink power control parameter set identifiers, wherein the MAC-CE message activates the one or more set of uplink power control parameters for the PUCCH resource based at least in part on the PUCCH resource identifier and the one or more uplink power control parameter set identifiers.

Aspect 24: The method of any of aspects 22 through 23, wherein each PUCCH resource of a set of PUCCH resources is configured with a single set of uplink power control parameters based at least in part on the RRC message.

Aspect 25: The method of any of aspects 22 through 24, wherein each PUCCH resource of a set of PUCCH resources is configured with multiple set of uplink power control parameters based at least in part on the RRC message.

Aspect 26: An apparatus for wireless communication at a UE, comprising at least one processor; and memory coupled to the at least one processor, the memory storing instructions executable by the at least one processor to cause the apparatus to perform a method of any of aspects 1 through 17.

Aspect 27: An apparatus for wireless communication at a UE, comprising at least one means for performing a method of any of aspects 1 through 17.

Aspect 28: A non-transitory computer-readable medium storing code for wireless communication at a UE, the code comprising instructions executable by at least one processor to perform a method of any of aspects 1 through 17.

Aspect 29: An apparatus for wireless communication at a first TRP, comprising at least one processor; and memory coupled to the at least one processor, the memory storing instructions executable by the at least one processor to cause the apparatus to perform a method of any of aspects 18 through 25.

Aspect 30: An apparatus for wireless communication at a first TRP, comprising at least one means for performing a method of any of aspects 18 through 25.

Aspect 31: A non-transitory computer-readable medium storing code for wireless communication at a first TRP, the code comprising instructions executable by at least one processor to perform a method of any of aspects 18 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by at least one processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by the at least one processor, the functions may be stored on or transmitted over as one or more instructions or code on a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving a radio resource control message comprising one or more sets of uplink power control parameters for a physical uplink control channel resource, wherein each set of the one or more sets of uplink power control parameters comprises an uplink power control parameter set identifier, a physical uplink control channel power index value, a pathloss reference signal index value, a closed loop index value, or a combination thereof;
    receiving a message scheduling transmission, by the UE, of uplink control information in the physical uplink control channel resource;
    receiving an indication that the UE is scheduled to transmit the uplink control information in the physical uplink control channel resource to both a first transmission-reception point and a second transmission-reception point;
    receiving a medium access control-control element message comprising a physical uplink control channel resource identifier and one or more uplink power control parameter set identifiers;
    activating the one or more sets of uplink power control parameters for the physical uplink control channel resource based at least in part on the physical uplink control channel resource identifier and the one or more uplink power control parameter set identifiers; and
    transmitting the uplink control information to the first transmission-reception point and to the second transmission-reception point in the physical uplink control channel resource based at least in part on activating the one or more sets of uplink power control parameters and without an uplink control channel beam indication to the UE.

2. The method of claim 1, further comprising:
    receiving signaling comprising a set of physical uplink control channel spatial relation information;
    selecting at least two physical uplink control channel spatial relation information from the set of physical uplink control channel spatial relation information based at least in part on the medium access control-control element message, the at least two physical uplink control channel spatial relation information comprising first physical uplink control channel spatial relation information and second physical uplink control channel spatial relation information; and
    determining a first set of uplink power control parameters and a second set of uplink power control parameters for the physical uplink control channel resource based at least in part on the at least two physical uplink control channel spatial relation information.

3. The method of claim 2, wherein a set of uplink beam parameters is not configured in the set of physical uplink control channel spatial relation information.

4. The method of claim 2, further comprising:
    refraining from applying a set of uplink beam parameters associated with the set of physical uplink control channel spatial relation information.

5. The method of claim 2, wherein a set of uplink beam parameters associated with the set of physical uplink control channel spatial relation information is nulled.

6. The method of claim 2, wherein a set of uplink beam parameters comprises a synchronization signal block parameter, a channel state information reference signal parameter, or a sounding reference signal parameter, or a combination thereof.

7. The method of claim 1, further comprising:
    determining that each physical uplink control channel resource associated with a physical uplink control channel transmission is configured with a single set of uplink power control parameters based at least in part on the radio resource control message; and
    transmitting the uplink control information to the first transmission-reception point and to the second transmission-reception point based at least in part on the single set of uplink power control parameters.

8. The method of claim 1, further comprising:
    determining that each physical uplink control channel resource associated with a physical uplink control channel transmission is configured with multiple set of uplink power control parameters based at least in part on the radio resource control message, wherein the multiple set of uplink power control parameters comprises a first set of uplink power control parameters and a second set of uplink power control parameters.

9. The method of claim 1, further comprising:
    determining a first set of uplink power control parameters comprising a first physical uplink control channel power index value, a first pathloss reference signal index value, or a first closed loop index value, or a combination thereof; and determining a second set of uplink power control parameters based at least in part on the first set of uplink power control parameters, the second set of uplink power control parameters comprising a second physical uplink control channel power index value, a second pathloss reference signal index value, or a second closed loop index value, or a combination thereof.

10. The method of claim 7, wherein determining the second set of uplink power control parameters is based at least in part on a set of uplink beam parameters comprising a reference signal index value.

11. The method of claim 7, wherein determining the second set of uplink power control parameters is based at least in part on a radio resource control configuration.

12. The method of claim 11, wherein the radio resource control configuration is per serving cell and each physical uplink control channel resource is configured per the serving cell.

13. The method of claim 11, wherein the radio resource control configuration is per BWP and each physical uplink control channel resource is configured per the BWP.

14. The method of claim 11, wherein the radio resource control configuration is per physical uplink control channel resource.

15. The method of claim 1, wherein transmitting the uplink control information comprises:
  transmitting the uplink control information to the first transmission-reception point and to the second transmission-reception point via one of intra-uplink control channel resource beam hopping, intra-slot repetition, or inter-slot repetition based at least in part on a number of repetitions associated with transmitting the uplink control information.

16. An apparatus for wireless communication at a user equipment (UE), comprising:
  at least one processor; and
  memory coupled to the at least one processor, the memory storing instructions executable by the at least one processor to cause the apparatus to:
    receive a radio resource control message comprising one or more sets of uplink power control parameters for a physical uplink control channel resource, wherein each set of the one or more sets of uplink power control parameters comprises an uplink power control parameter set identifier, a physical uplink control channel power index value, a pathloss reference signal index value, a closed loop index value, or a combination thereof;
    receive a message scheduling transmission, by the UE, of uplink control information in the physical uplink control channel resource;
    receive an indication that the UE is scheduled to transmit the uplink control information in the physical uplink control channel resource to both a first transmission-reception point and a second transmission-reception point;
    receive a medium access control-control element message comprising a physical uplink control channel resource identifier and one or more uplink power control parameter set identifiers;
    activate the one or more sets of uplink power control parameters for the physical uplink control channel resource based at least in part on the physical uplink control channel resource identifier and the one or more uplink power control parameter set identifiers; and
    transmit the uplink control information to the first transmission-reception point and to the second transmission-reception point in the physical uplink control channel resource based at least in part on activating the one or more sets of uplink power control parameters and without an uplink control channel beam indication to the UE.

17. The apparatus of claim 16, wherein the instructions are further executable by the at least one processor to cause the apparatus to:
  receive signaling comprising a set of physical uplink control channel spatial relation information;
  select at least two physical uplink control channel spatial relation information from the set of physical uplink control channel spatial relation information based at least in part on the medium access control-control element message, the at least two physical uplink control channel spatial relation information comprising first physical uplink control channel spatial relation information and second physical uplink control channel spatial relation information; and
  determine a first set of uplink power control parameters and a second set of uplink power control parameters for the physical uplink control channel resource based at least in part on the at least two physical uplink control channel spatial relation information.

18. The apparatus of claim 17, wherein a set of uplink beam parameters is not configured in the set of physical uplink control channel spatial relation information.

19. The apparatus of claim 17, wherein the instructions are further executable by the at least one processor to cause the apparatus to:
  refrain from applying a set of uplink beam parameters associated with the set of physical uplink control channel spatial relation information.

20. The apparatus of claim 17, wherein a set of uplink beam parameters associated with the set of physical uplink control channel spatial relation information is nulled.

21. The apparatus of claim 17, wherein a set of uplink beam parameters comprises a synchronization signal block parameter, a channel state information reference signal parameter, or a sounding reference signal parameter, or a combination thereof.

22. The apparatus of claim 16, wherein the instructions are further executable by the at least one processor to cause the apparatus to:
  determine that each physical uplink control channel resource associated with a physical uplink control channel transmission is configured with a single set of uplink power control parameters based at least in part on the radio resource control message; and
  transmit the uplink control information to the first transmission-reception point and to the second transmission-reception point based at least in part on the single set of uplink power control parameters.

23. The apparatus of claim 16, wherein the instructions are further executable by the at least one processor to cause the apparatus to:
  determine that each physical uplink control channel resource associated with a physical uplink control channel transmission is configured with multiple set of uplink power control parameters based at least in part on the radio resource control message, wherein the multiple set of uplink power control parameters comprises a first set of uplink power control parameters and a second set of uplink power control parameters.

24. The apparatus of claim 16, wherein the instructions are further executable by the at least one processor to cause the apparatus to:

determine a first set of uplink power control parameters comprising a first physical uplink control channel power index value, a first pathloss reference signal index value, or a first closed loop index value, or a combination thereof; and determine a second set of uplink power control parameters based at least in part on the first set of uplink power control parameters, the second set of uplink power control parameters comprising a second physical uplink control channel power index value, a second pathloss reference signal index value, or a second closed loop index value, or a combination thereof.

25. The apparatus of claim 24, wherein determining the second set of uplink power control parameters is based at least in part on a set of uplink beam parameters comprising a reference signal index value.

26. The apparatus of claim 24, wherein determining the second set of uplink power control parameters is based at least in part on a radio resource control configuration.

27. The apparatus of claim 16, wherein the radio resource control configuration is per serving cell and each physical uplink control channel resource is configured per the serving cell.

28. The apparatus of claim 16, wherein the radio resource control configuration is per bandwidth part and each physical uplink control channel resource is configured per the bandwidth part.

29. The apparatus of claim 16, wherein the radio resource control configuration is per physical uplink control channel resource.

30. The apparatus of claim 16, wherein the instructions to transmit the uplink control information are executable by the at least one processor to cause the apparatus to:

transmit the uplink control information to the first transmission-reception point and to the second transmission-reception point via one of intra-uplink control channel resource beam hopping, intra-slot repetition, or inter-slot repetition based at least in part on a number of repetitions associated with transmitting the uplink control information.

\* \* \* \* \*